(12) United States Patent
Harada

(10) Patent No.: US 7,145,735 B2
(45) Date of Patent: Dec. 5, 2006

(54) IMAGE PICKUP OPTICAL SYSTEM AND CAMERA HAVING IT

(75) Inventor: Akira Harada, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 10/913,208

(22) Filed: Aug. 6, 2004

(65) Prior Publication Data

US 2005/0063072 A1 Mar. 24, 2005

(30) Foreign Application Priority Data

Aug. 8, 2003 (JP) .............................. 2003-206818

(51) Int. Cl.
- G02B 13/02 (2006.01)
- G02B 27/64 (2006.01)
- G02B 15/14 (2006.01)

(52) U.S. Cl. .................... 359/745; 359/557; 359/686; 359/687

(58) Field of Classification Search ................ 359/686, 359/687, 554, 557, 745–748
See application file for complete search history.

(56) References Cited

U.S. PATENT DOCUMENTS 5,598,299 A 1/1997 Hayakawa 5,825,546 A 10/1998 Matsui
6,825,994 B1 * 11/2004 Harada ........................ 359/774

FOREIGN PATENT DOCUMENTS

| JP | 7-294853 | 11/1995 |
|---|---|---|
| JP | 9-197265 | 7/1997 |

* cited by examiner

Primary Examiner—Scott J. Sugarman
(74) Attorney, Agent, or Firm—Morgan & Finnegan LLP

(57) ABSTRACT

The present invention discloses an image pickup optical system which has a first lens unit with positive optical power, a second lens unit with negative optical power, a third lens unit with positive optical power, and a fourth lens unit in order from an object side to an image side, where the second lens unit moves toward an image side and the third lens unit moves toward an object side respectively during focusing from an infinite object to a short distance object. The first lens unit has a first lens sub-unit, and a second lens sub-unit in order from an object side to an image side, and corrects a blur of a taken image by moving the second lens sub-unit so as to have a component in a direction orthogonal to an optical axis. Thereby, the present invention realizes the image pickup optical system which can always obtain a favorable image even if a shake of a camera or the like arises.

9 Claims, 17 Drawing Sheets

IMAGE PICKUP OPTICAL SYSTEM AND CAMERA HAVING IT

BACKGROUND OF THE INVENTION

1. Field of the Invention

The present invention relates to an image pickup optical system and a camera having it, and for example, it is suitable for a digital still camera, a video camera, a silver halide photographic camera, etc.

2. Related Background Art

Heretofore, in imaging apparatuses such as a silver halide photographic camera, a video camera, and a digital still camera, there is an article, called a macro lens or a micro lens (hereinafter referred to as "macro lens"), among image pickup optical systems mainly used for image pickup of short distance objects.

In the macro lens, in high magnification, a taken image deteriorates largely since the taken image blurs significantly by the vibration of an imaging system. In addition, since the depth of field becomes extremely small in high magnification image pickup, it becomes frequent to take an image with stopping down (enlarging f-number). Hence, since exposure time becomes long inevitably, it becomes easy to receive the influence of the vibration of the imaging system. For this reason, when an image is taken with a macro lens in high magnification, it becomes necessary to perform correction lest the displacement of a taken image, that is, so-called a blur of the taken image should arise even when the imaging system vibrates.

In the macro lens, a vibration reduction optical system having a vibration reduction function, which prevents a blur of a taken image, is known (Japanese Patent Application Laid-Open No. H7-294853 (counterpart: U.S. Pat. No. 5,598,299), and Japanese Patent Application Laid-Open No. H9-197265 (counterpart: U.S. Pat. No. 5,825,546)). In Japanese Patent Application Laid-Open No. H7-294853, at the time of focusing on a object in a short distance, the short distance image pickup in a life-size is performed by a system of making a front part of a lens system zoom in toward an object, and vibration reduction is achieved by moving a part of a lens unit, which is fixed during focusing, to a direction orthogonal to an optical axis.

In addition, in Japanese Patent Application Laid-Open No. H9-197265, inner focusing that the overall length of a lens system is constant during focusing is adapted to perform the vibration reduction by moving a part of the lens unit, which is the nearest to an image and is fixed during focusing, to a direction orthogonal to an optical axis.

Generally, in a mechanism to obtain a static image by canceling a displacement of a taken image due to the vibration of some lens units of an imaging system, it is required that a correction amount of the displacement of an image is large, and that a movement amount of the lens unit (movable lens unit) driven for the correction of the displacement of the image is small.

In addition, if many eccentric aberrations such as eccentric coma aberration, eccentric astigmatism, eccentric chromatic aberration, and eccentric field curvature aberration arise by decentering the movable lens unit, a taken image blurs because of the eccentric aberration when the displacement of an image is corrected. For example, when many eccentric distortion aberrations arise, a movement amount of a taken image on an optical axis and a movement amount of the taken image of a peripheral part of an image plane, with respect to a single movement amount of the moving lens unit, differ. Hence, when the moving lens unit is decentered so as to correct the displacement of the taken image on the optical axis, a phenomenon equivalent to the displacement of the image arises in the peripheral part of the image plane, and hence, it causes the deterioration of the optical characteristics remarkably.

In this way, in an optical system having a vibration reduction function, so as to reduce the deterioration of image quality with the movable lens unit in an eccentric state by moving the movable lens unit, and to downsize an entire apparatus, it is required that not only an amount of emergence of an eccentric aberration is small, but also so-called eccentricity sensitivity is large. Here, the eccentricity sensitivity denotes a degree of capability to correct a large displacement of an image with a small amount of the movement of the movable lens unit, and is represented as a ratio $\Delta x/\Delta H$ where $\Delta x$ denotes a correction amount of the displacement of an image, and $\Delta H$ demotes a unit amount of movement of the movable lens unit.

In addition, as a lens type of the macro lens, heretofore, a symmetrical lens type (so-called Gaussian type) or an approximately symmetrical lens type has been used in many cases. In these lens types, since the focusing on from an infinite object to a short distance object is performed by moving the entire lens unit or some lens unit toward an object side, overall lens unit length changes. Therefore, these lens types are disadvantageous at the point of user-friendliness in comparison with an inner focus type that overall lens unit length is constant.

Furthermore, in an inner focusing type macro lens, in view of a mechanism, it is difficult for the focusing lens unit for focusing on short distance objects, to have the construction of providing a function as a movable lens unit for the correction of the displacement of an image since the mechanical structure is upsized and becomes complicated. Moreover, also in the configuration of the lens unit, which is fixed during focusing, to be a movable lens unit for correcting the displacement of an image, it becomes important to obtain a large displacement amount in a small movement amount of the movable lens unit in a direction orthogonal to the optical axis.

SUMMARY OF THE INVENTION

The present invention aims at providing of an image pickup optical system which can easily achieve sufficiently large displacement correction (blur correction) in a small movement amount thereof, and can perform the downsizing of an entire apparatus and proximity image pickup in about life size in high-performance.

An exemplary image pickup optical system of the present invention has a first lens unit with positive refracting power, a second lens unit with negative refractive power, a third lens unit with positive refractive power, and a fourth lens unit in order from an object side to an image side, and the second lens unit is moved toward the image side and the third lens unit toward the object side respectively during focusing from an infinite object to a short distance object. Then, the first lens unit has a first lens sub-unit, and a second lens sub-unit in order from an object to an image side, and displaces an image, which the image pickup optical system forms, by moving the second lens sub-unit so as to have a component in a direction orthogonal to an optical axis.

DESCRIPTION OF THE PREFERRED EMBODIMENTS

Hereafter, embodiments of an image pickup optical system (image pickup lens system) and an imaging apparatus of the present invention will be explained by using drawings.

Figure 1:
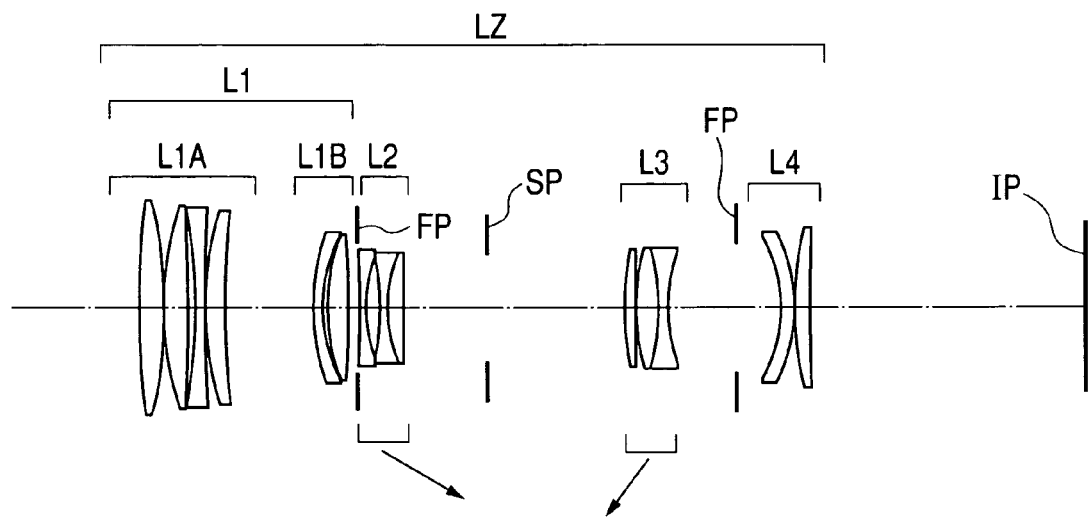
FIG. 1 is a sectional view of an image pickup lens system of a first embodiment at the time of image pickup of an infinite object.
Figure 2:
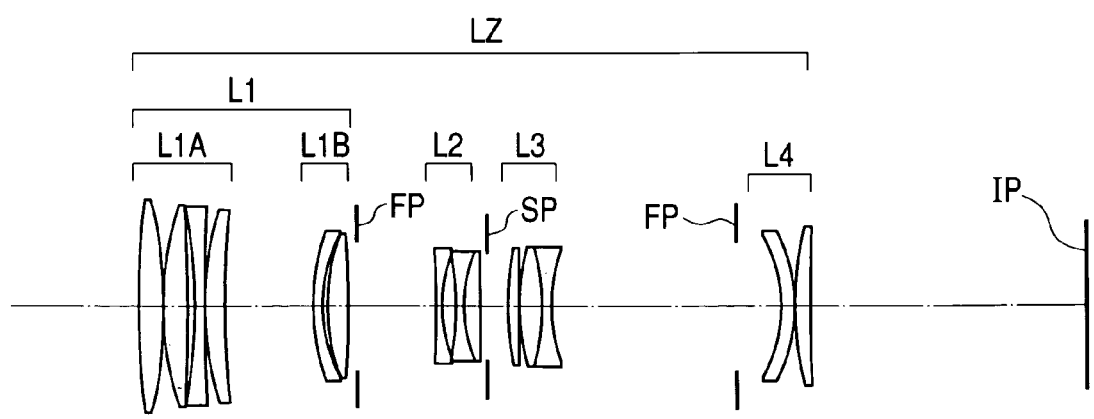
FIG. 2 is a sectional view of the image pickup lens system of the first embodiment at the time of image pickup of a short distance object (magnification β=−1)
Figure 3:
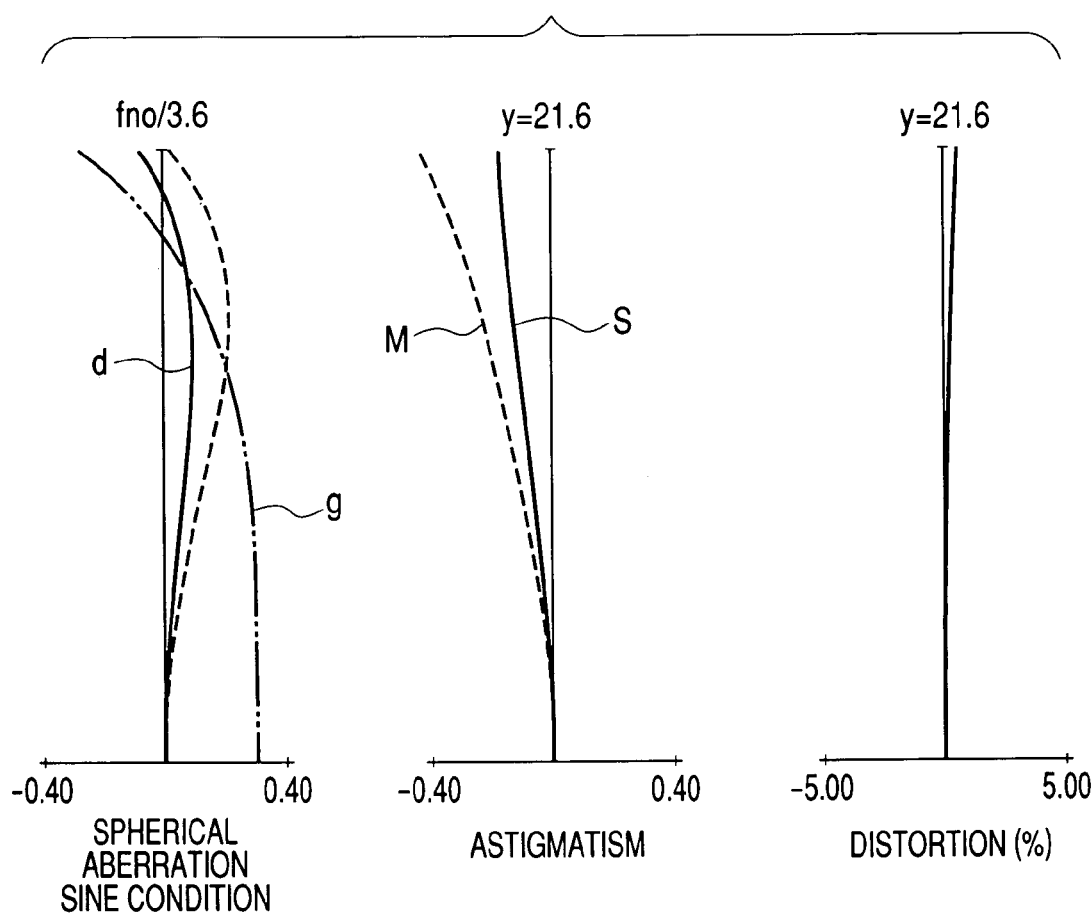
FIG. 3 is a longitudinal aberration diagram of the image pickup lens system of the first embodiment at the time of image pickup of an infinite object.
Figure 4:
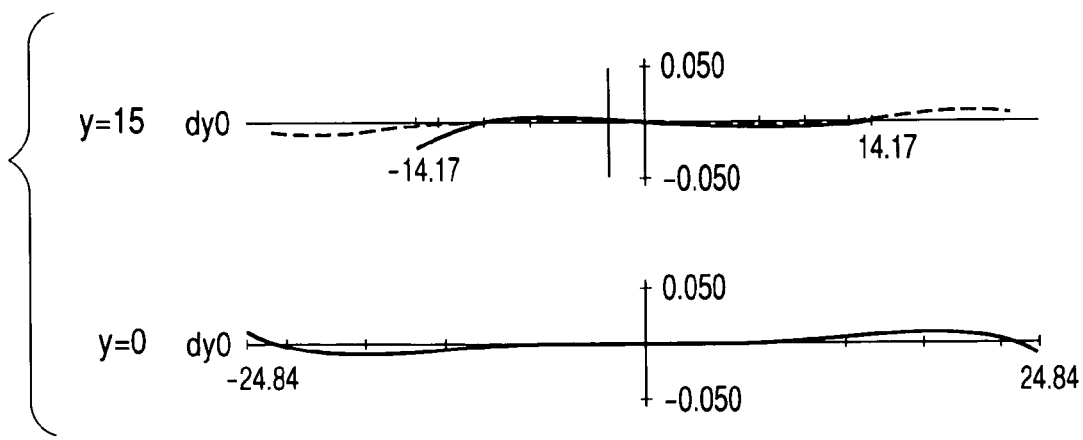
FIG. 4 is a lateral aberration diagram of the image pickup lens system of the first embodiment at the time of image pickup of an infinite object.
Figure 5:
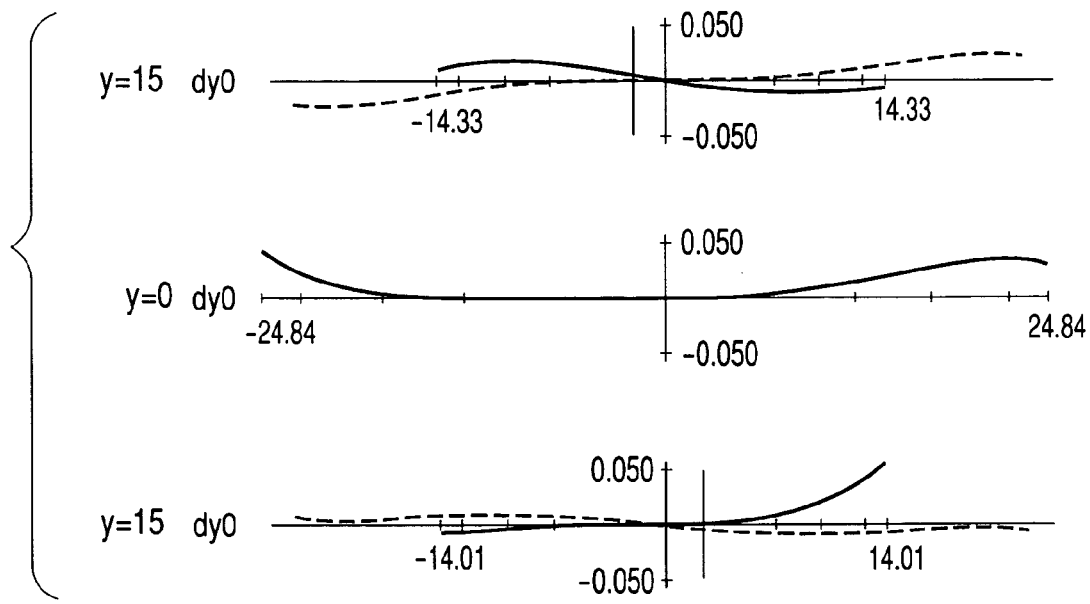
FIG. 5 is a lateral aberration diagram of the image pickup lens system of the first embodiment in a vibration proof state (0.3°) at the time of image pickup of an infinite object.
Figure 6:
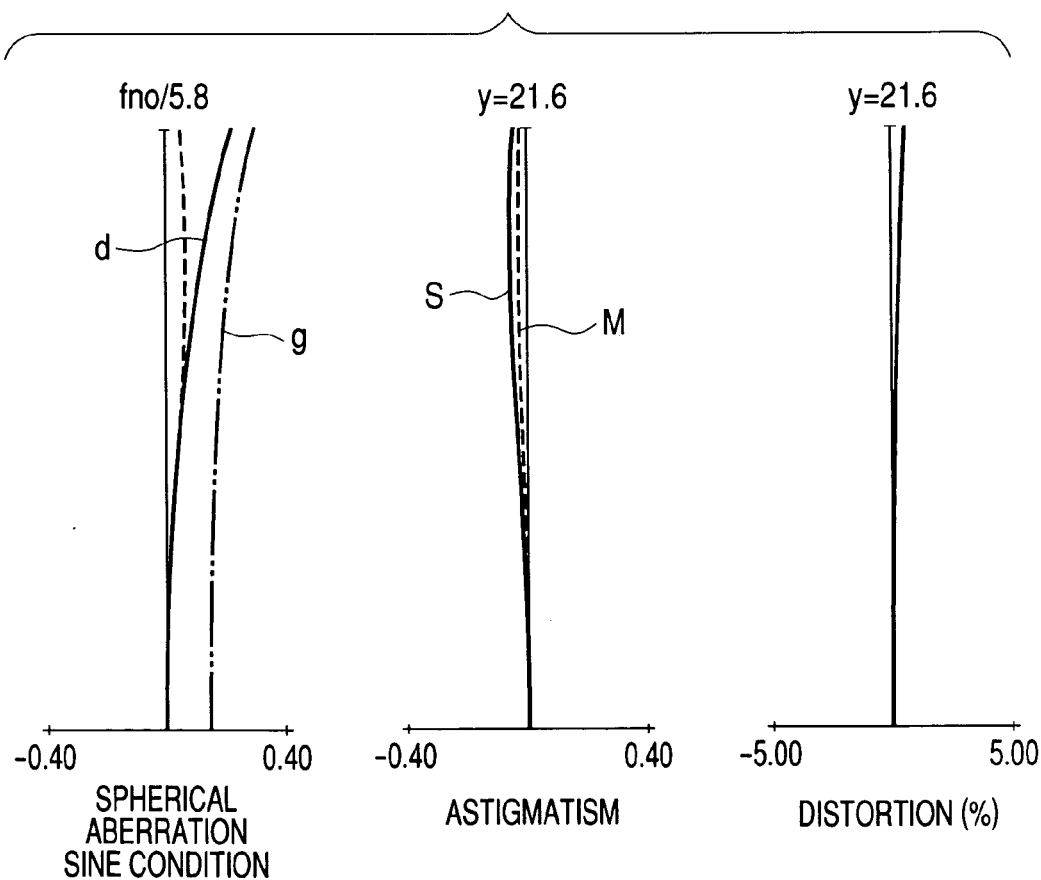
FIG. 6 is a longitudinal aberration diagram of the image pickup lens system of the first embodiment at the time of image pickup of a short distance object.
Figure 7:
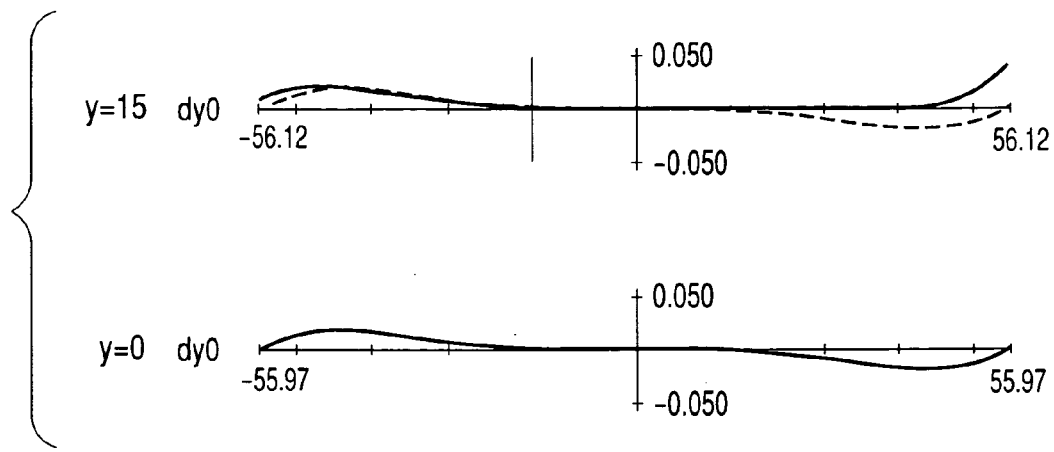
FIG. 7 is a lateral aberration diagram of the image pickup lens system of the first embodiment at the time of image pickup of a short distance object.
Figure 8:
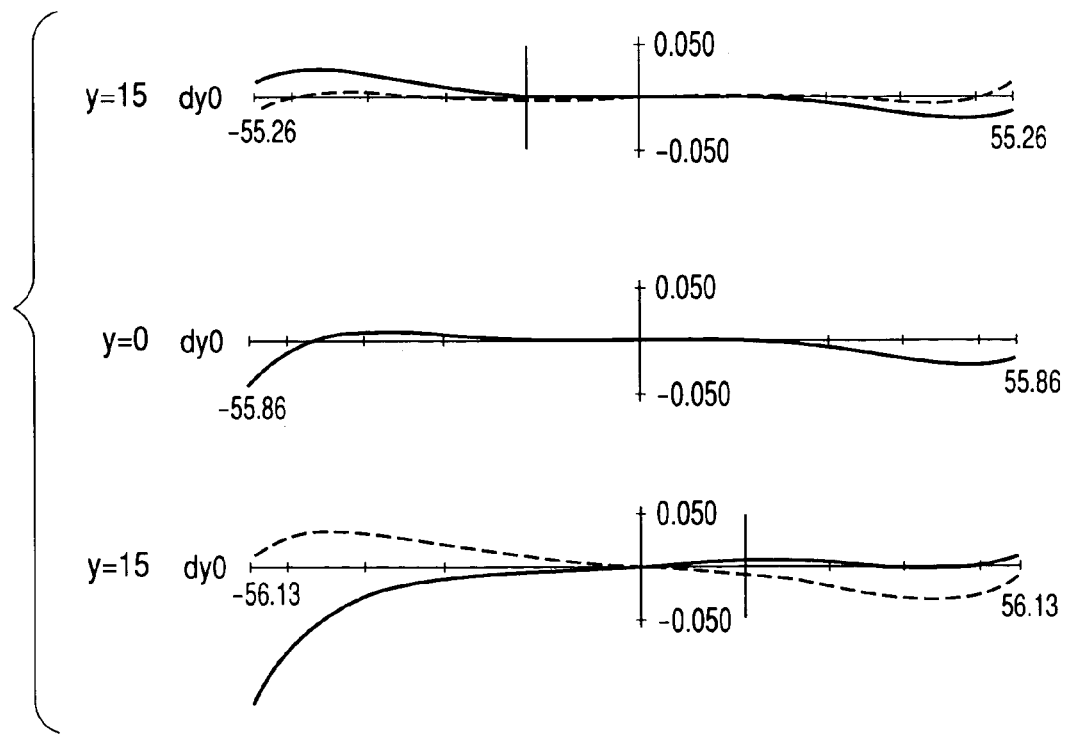
FIG. 8 is a lateral aberration diagram of the image pickup lens system of the first embodiment in a vibration proof state (0.3°) at the time of image pickup of a short distance object.

FIG. 1 is a sectional view of an image pickup lens system of a first embodiment at the time of image pickup of an infinite object (at the time of focusing on an infinite object). FIG. 2 is a sectional view of the image pickup lens system of the first embodiment at the time of image pickup of a short distance object (magnification β=−1) (at the time of focusing on a short distance object). FIG. 3 is a longitudinal aberration diagram of the image pickup lens system of the first embodiment at the time of image pickup of an infinite object. FIG. 4 is a lateral aberration diagram of the image pickup lens system of the first embodiment at the time of image pickup of an infinite object. FIG. 5 is a lateral aberration diagram of the image pickup lens system of the first embodiment in a vibration reduction state (0.3°) at the time of image pickup of an infinite object. FIG. 6 is a longitudinal aberration diagram of the image pickup lens system of the first embodiment at the time of image pickup of a short distance object. FIG. 7 is a lateral aberration diagram of the image pickup lens system of the first embodiment at the time of image pickup of a short distance object. FIG. 8 is a lateral aberration diagram of the image pickup lens system of the first embodiment in a vibration reduction state (0.3°) at the time of image pickup of a short distance object.

Figure 9:
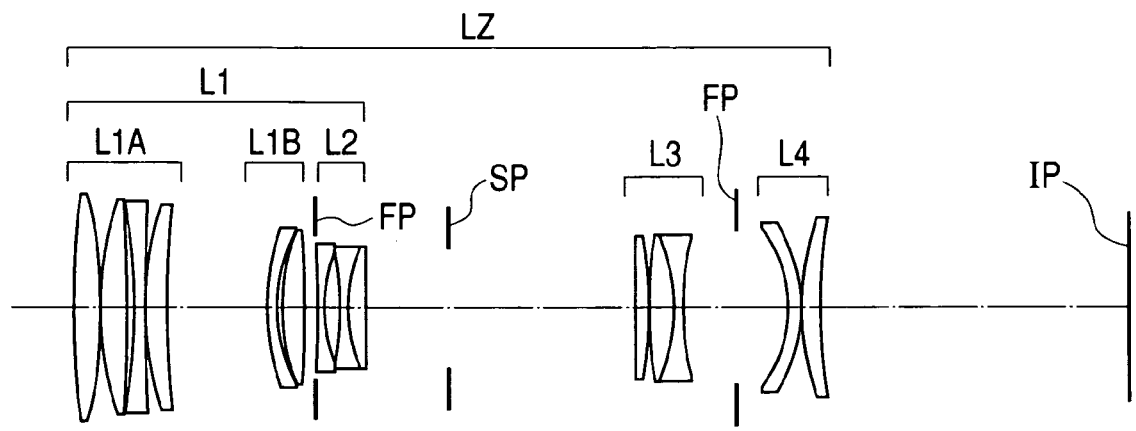
FIG. 9 is a sectional view of an image pickup lens system of a second embodiment at the time of image pickup of an infinite object.
Figure 10:
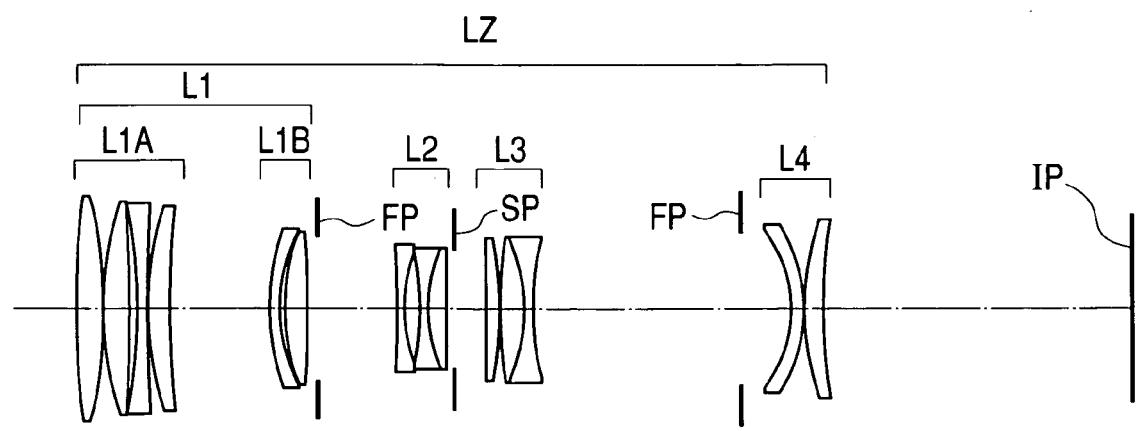
FIG. 10 is a sectional view of the image pickup lens system of the second embodiment at the time of image pickup of a short distance object (magnification β=−1)
Figure 11:
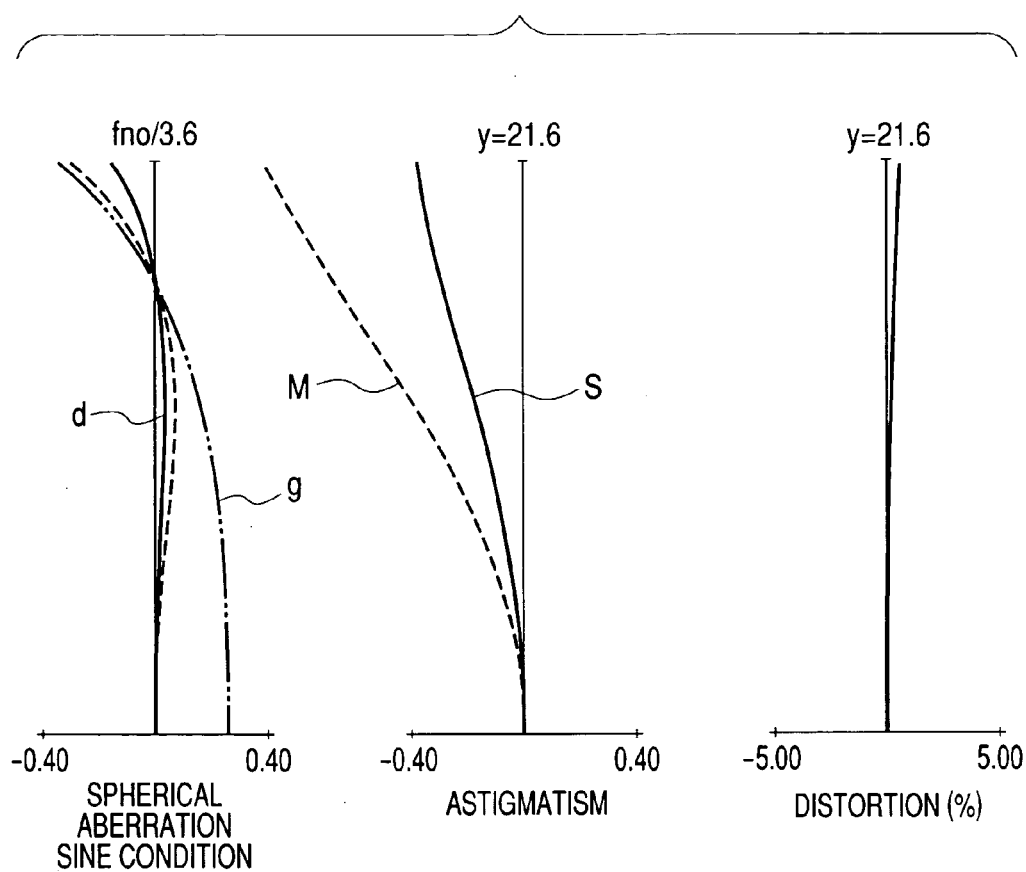
FIG. 11 is a longitudinal aberration diagram of the image pickup lens system of the second embodiment at the time of image pickup of an infinite object.
Figure 12:
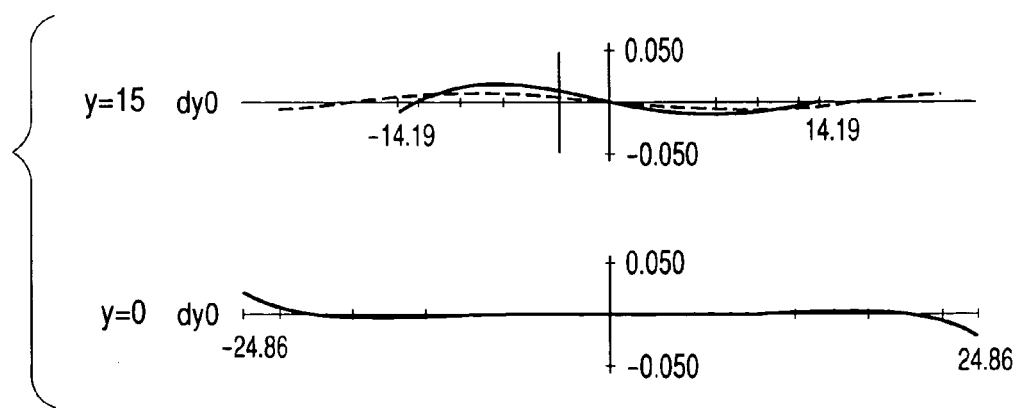
FIG. 12 is a lateral aberration diagram of the image pickup lens system of the second embodiment at the time of image pickup of an infinite object.
Figure 13:
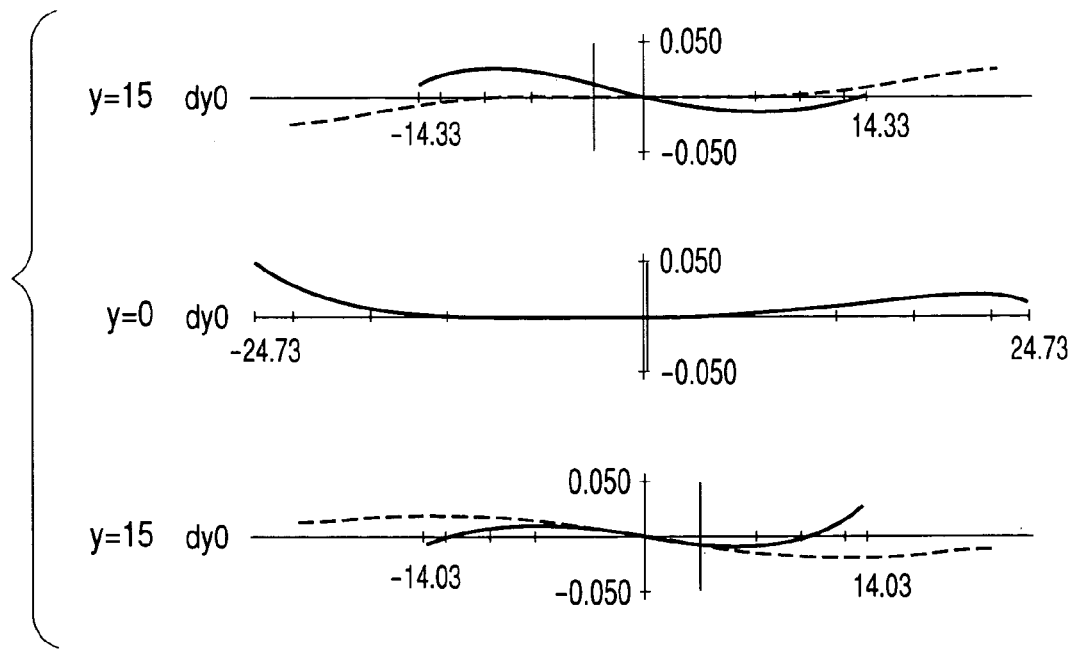
FIG. 13 is a lateral aberration diagram of the image pickup lens system of the second embodiment in a vibration proof state (0.3°) at the time of image pickup of an infinite object.
Figure 14:
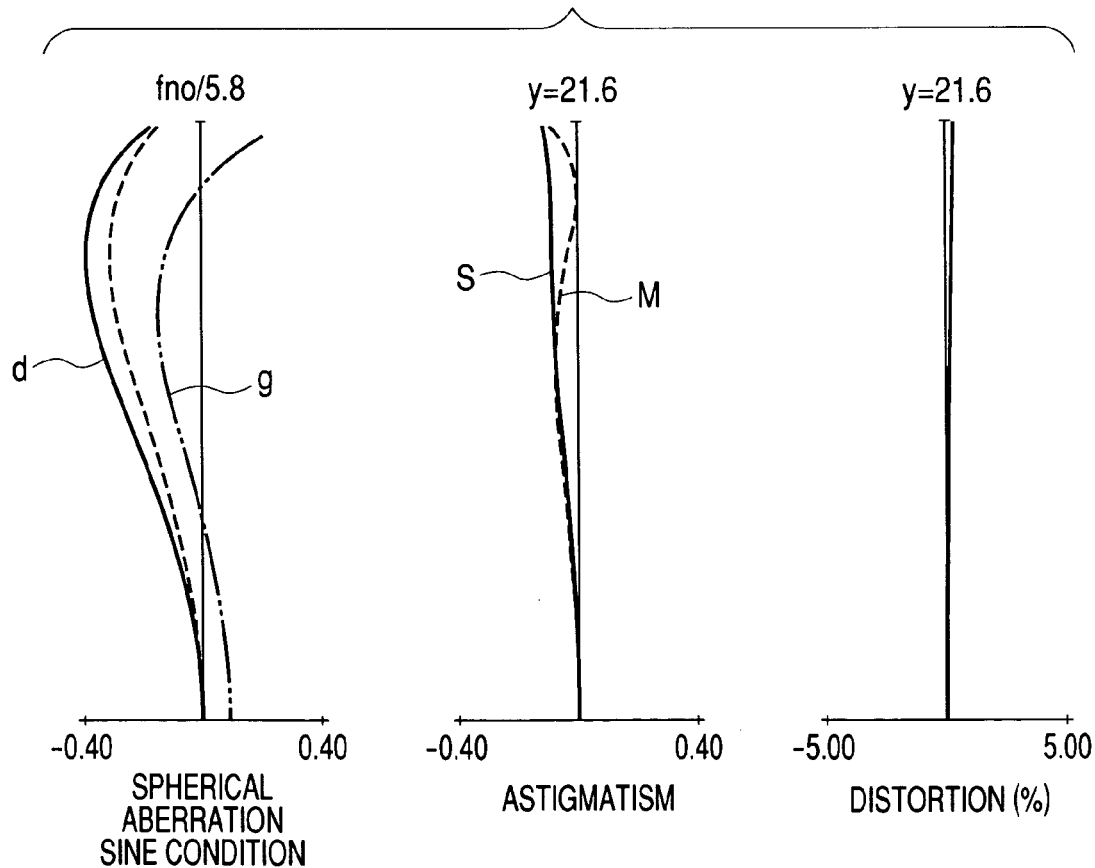
FIG. 14 is a longitudinal aberration diagram of the image pickup lens system of the second embodiment at the time of image pickup of a short distance object.
Figure 15:
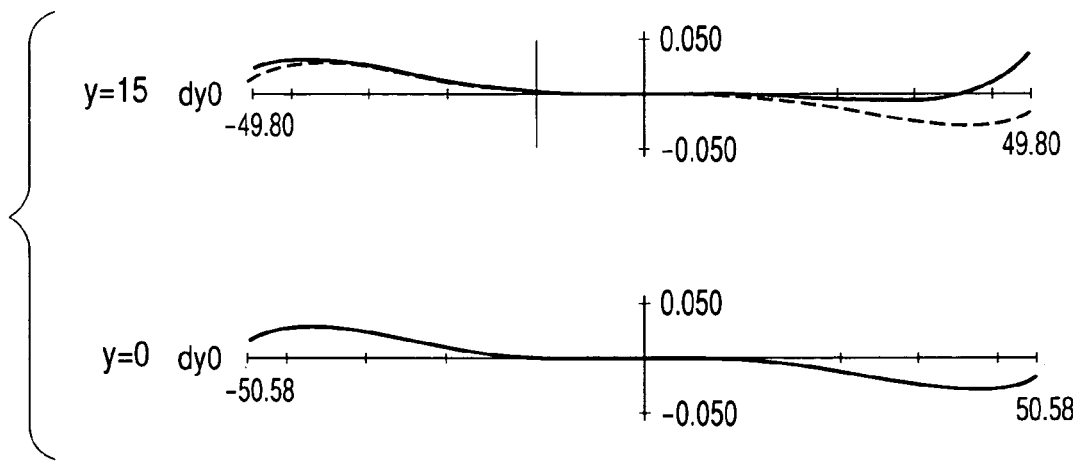
FIG. 15 is a lateral aberration diagram of the image pickup lens system of the second embodiment at the time of image pickup of a short distance object.
Figure 16:
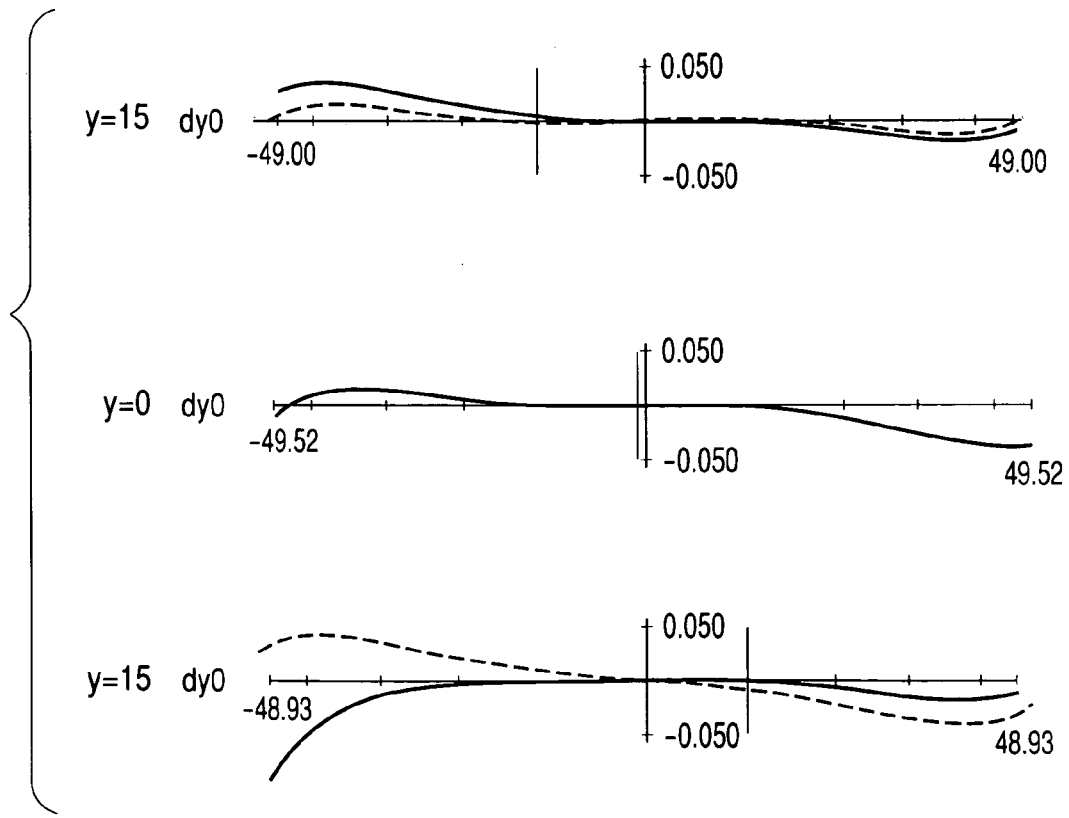
FIG. 16 is a lateral aberration diagram of the image pickup lens system of the second embodiment in a vibration proof state (0.3°) at the time of image pickup of the short distance object.

FIG. 9 is a sectional view of an image pickup lens system of a second embodiment at the time of image pickup of an infinite object. FIG. 10 is a sectional view of the image pickup lens system of the second embodiment at the time of image pickup of a short distance object (magnification β=−1). FIG. 11 is a longitudinal aberration diagram of the image pickup lens system of the second embodiment at the time of image pickup of an infinite object. FIG. 12 is a lateral aberration diagram of the image pickup lens system of the second embodiment at the time of image pickup of an infinite object. FIG. 13 is a lateral aberration diagram of the image pickup lens system of the second embodiment in a vibration reduction state (0.3°) at the time of image pickup of an infinite object. FIG. 14 is a longitudinal aberration diagram of the image pickup lens system of the second embodiment at the time of image pickup of a short distance object. FIG. 15 is a lateral aberration diagram of the image pickup lens system of the second embodiment at the time of image pickup of a short distance object. FIG. 16 is a lateral aberration diagram of the image pickup lens system of the second embodiment in a vibration reduction state (0.3°) at the time of image pickup of a short distance object.

Figure 17:
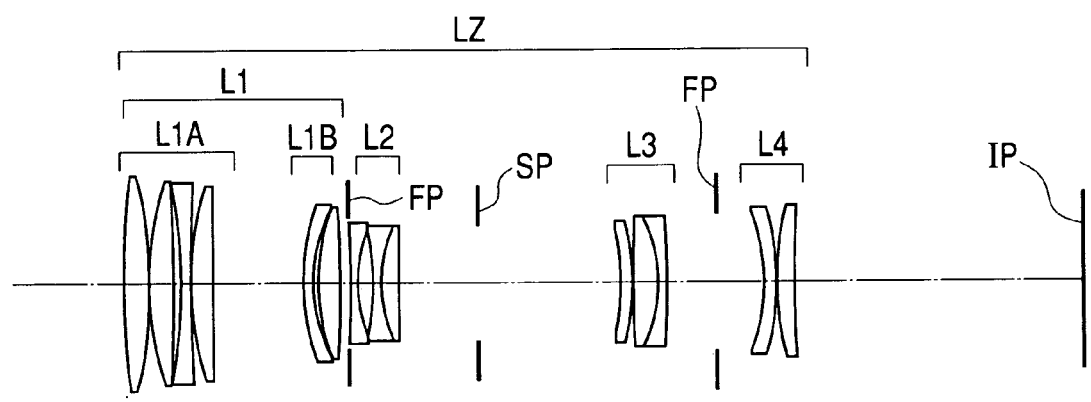
FIG. 17 is a sectional view of an image pickup lens system of a third embodiment at the time of image pickup of an infinite object.
Figure 18:
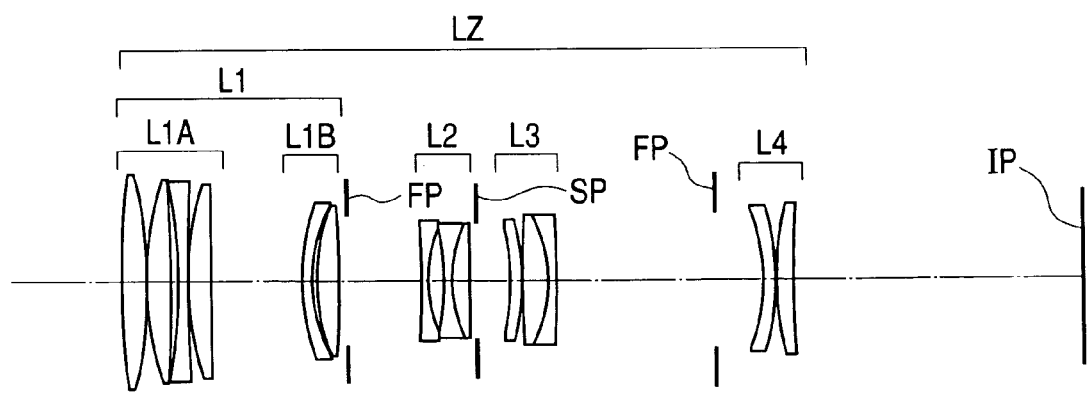
FIG. 18 is a sectional view of the image pickup lens system of the third embodiment at the time of image pickup of a short distance object (magnification β=−1)
Figure 19:
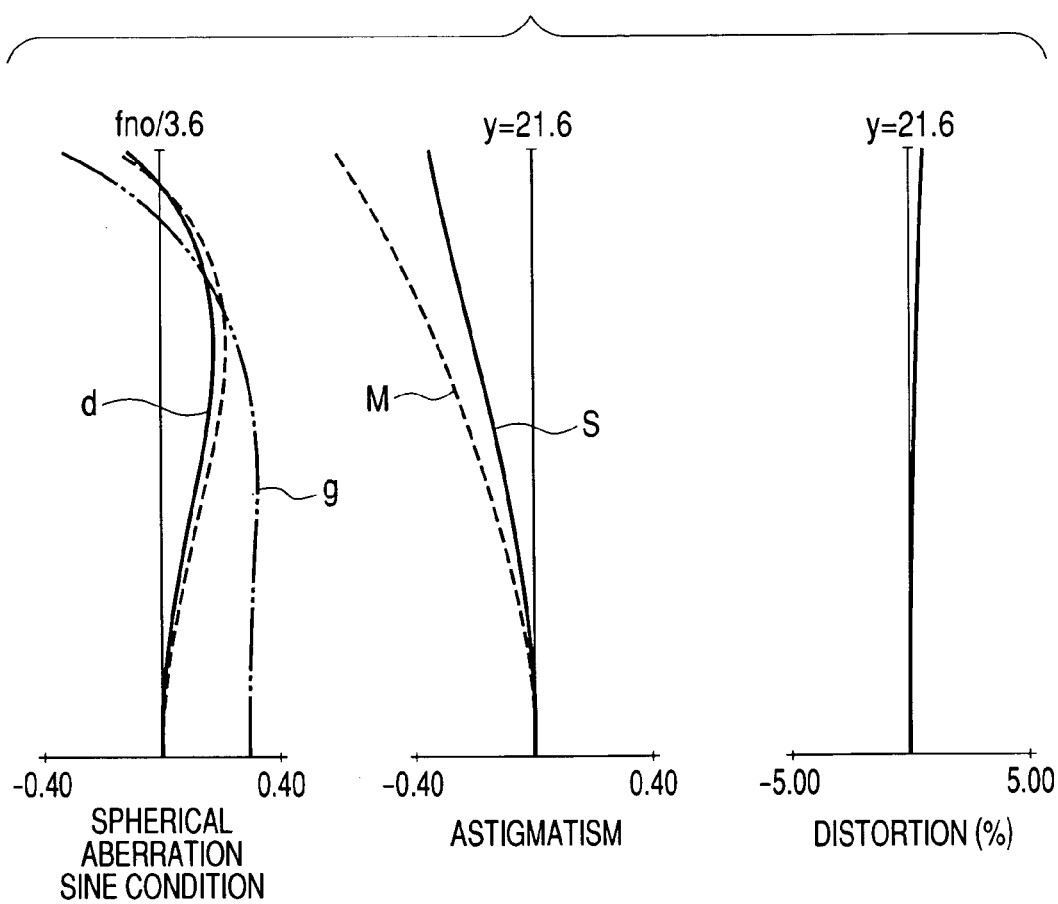
FIG. 19 is a longitudinal aberration diagram of the image pickup lens system of the third embodiment at the time of image pickup of an infinite object.
Figure 20:
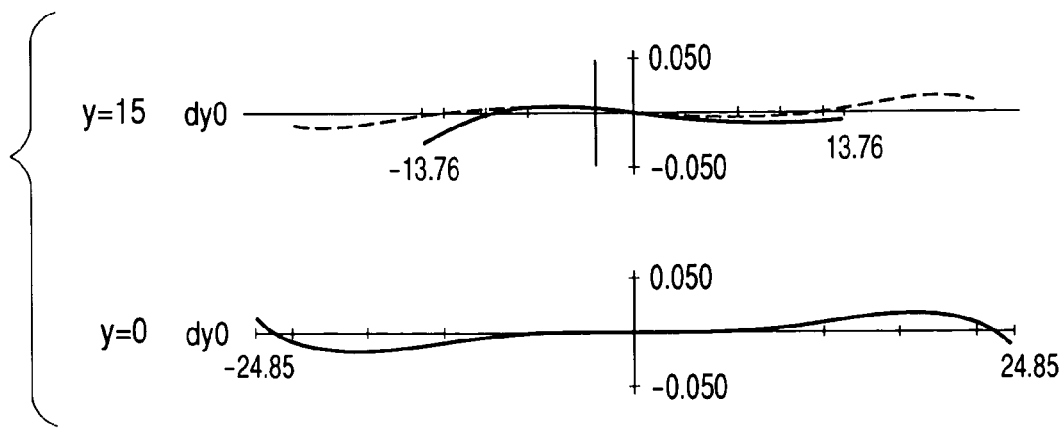
FIG. 20 is a lateral aberration diagram of the image pickup lens system of the third embodiment at the time of image pickup of an infinite object.
Figure 21:
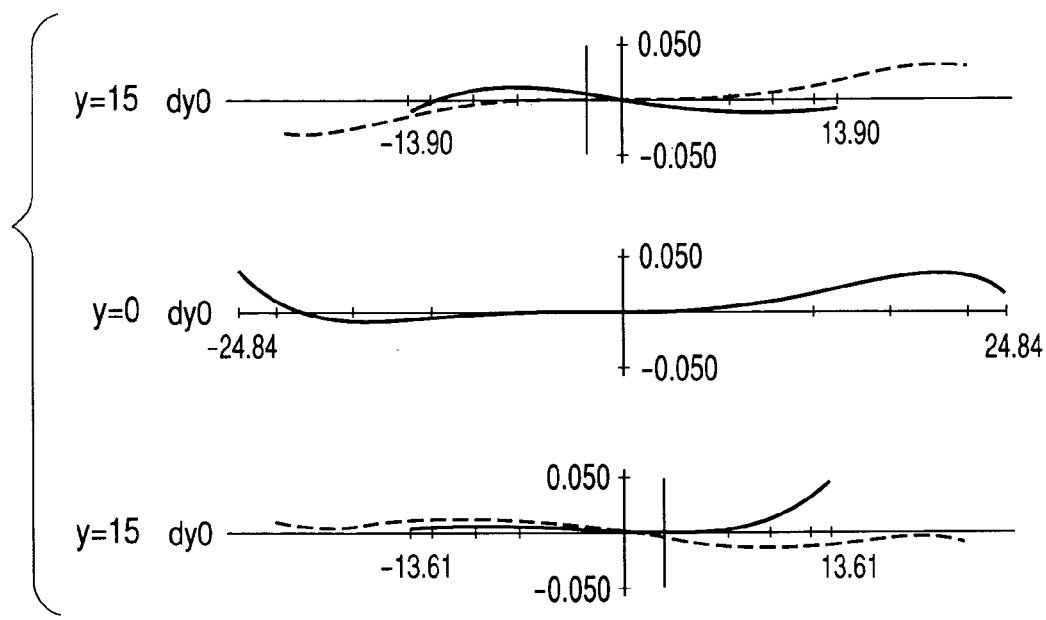
FIG. 21 is a lateral aberration diagram of the image pickup lens system of the third embodiment in a vibration proof state (0.3°) at the time of image pickup of the infinite object.
Figure 22:
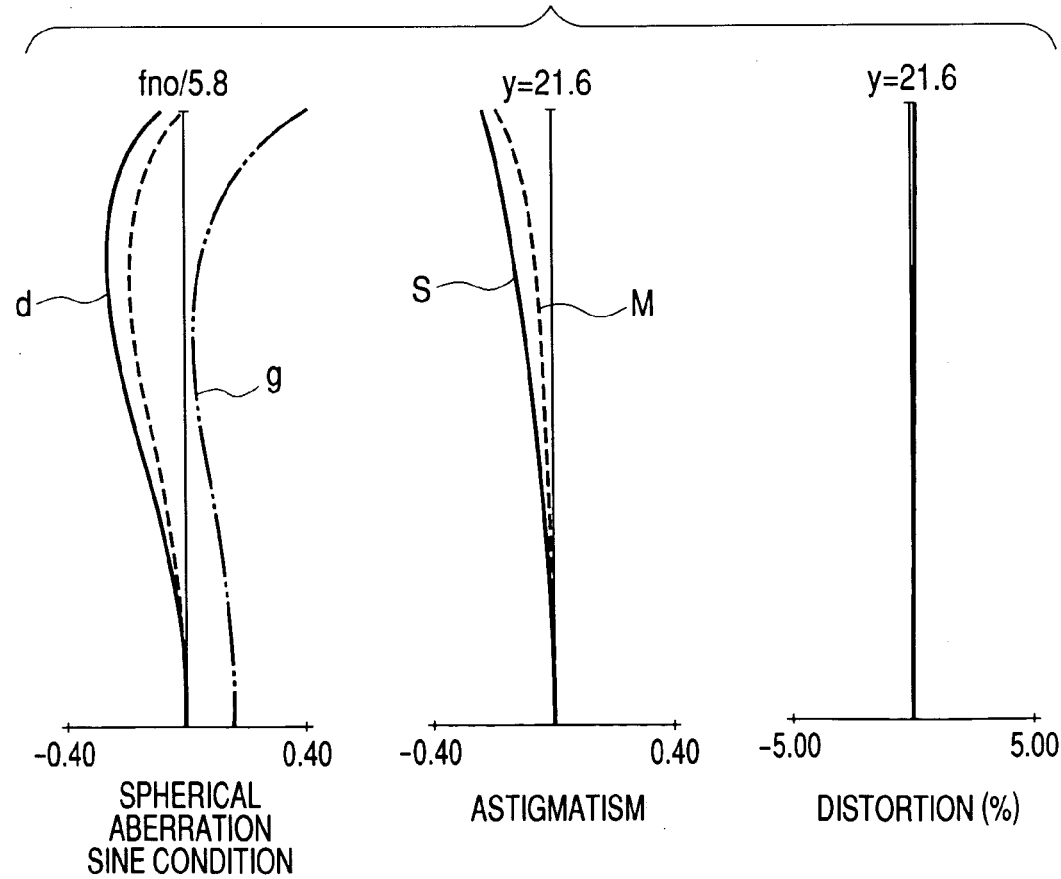
FIG. 22 is a longitudinal aberration diagram of the image pickup lens system of the third embodiment at the time of image pickup of a short distance object.
Figure 23:
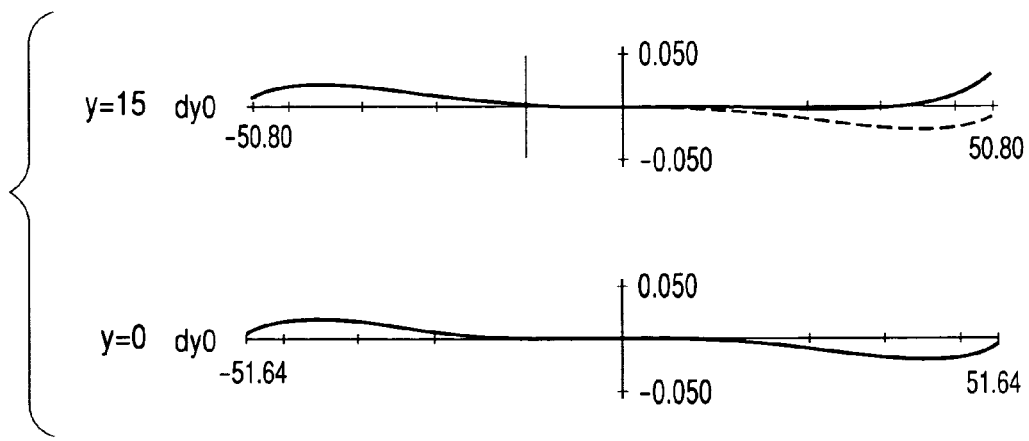
FIG. 23 is a lateral aberration diagram of the image pickup lens system of the third embodiment at the time of image pickup of a short distance object.
Figure 24:
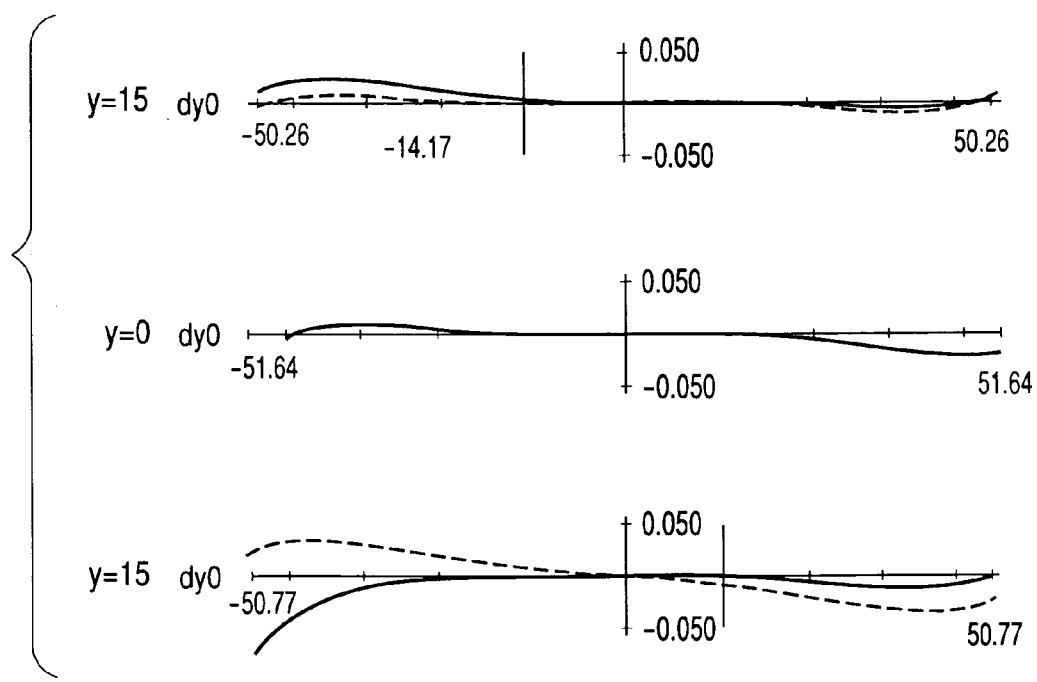
FIG. 24 is a lateral aberration diagram of the image pickup lens system of the third embodiment in a vibration proof state (0.3°) at the time of image pickup of a short distance object.

FIG. 17 is a sectional view of an image pickup lens system of a third embodiment at the time of image pickup of an infinite object. FIG. 18 is a sectional view of the image pickup lens system of the third embodiment at the time of image pickup of a short distance object (magnification β=−1). FIG. 19 is a longitudinal aberration diagram of the image pickup lens system of the third embodiment at the time of image pickup of an infinite object. FIG. 20 is a lateral aberration diagram of the image pickup lens system of the third embodiment at the time of image pickup of an infinite object. FIG. 21 is a lateral aberration diagram of the image pickup lens system of the third embodiment in a vibration reduction state (0.3°) at the time of image pickup of an infinite object. FIG. 22 is a longitudinal aberration diagram of the image pickup lens system of the third embodiment at the time of image pickup of a short distance object. FIG. 23 is a lateral aberration diagram of the image pickup lens system of the third embodiment at the time of image pickup of a short distance object. FIG. 24 is a lateral aberration diagram of the image pickup lens system of the third embodiment in a vibration reduction state (0.3°) at the time of image pickup of a short distance object.

Figure 25:
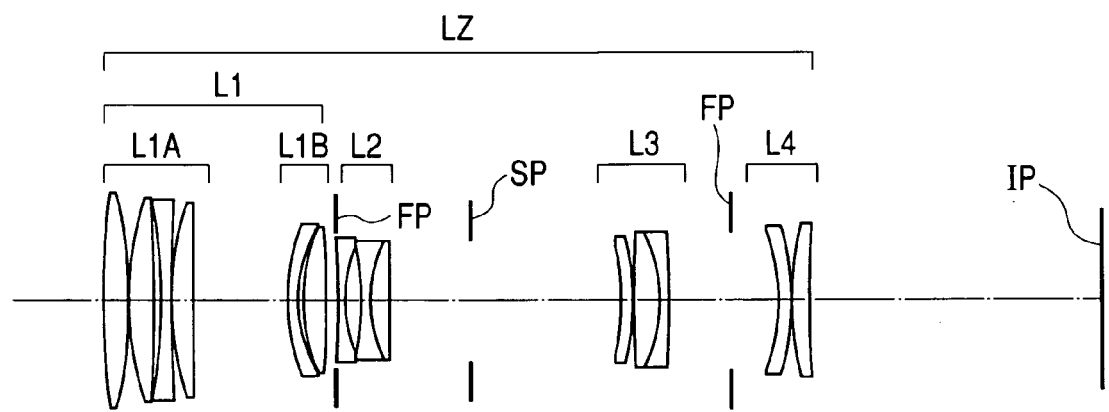
FIG. 25 is a sectional view of an image pickup lens system of a fourth embodiment at the time of image pickup of an infinite object.
Figure 26:
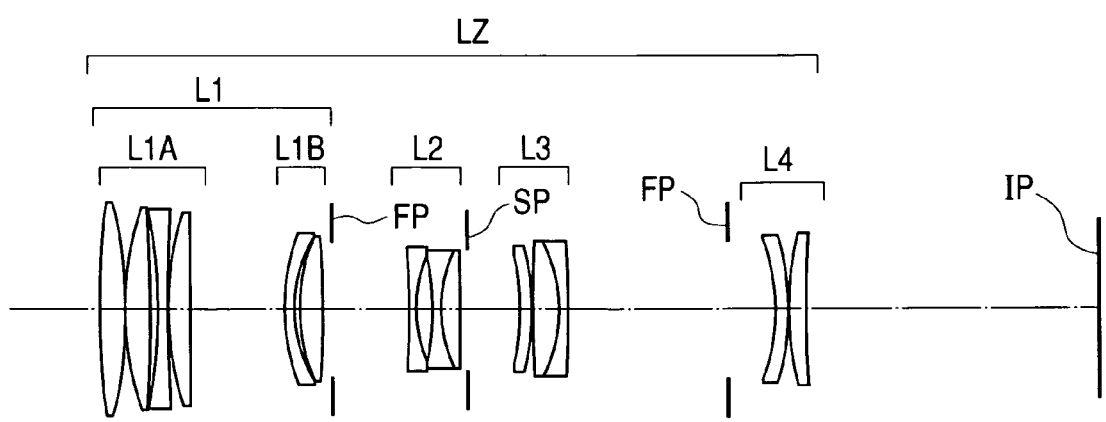
FIG. 26 is a sectional view of the image pickup lens system of the fourth embodiment at the time of image pickup of a short distance object (magnification β=−1)
Figure 27:
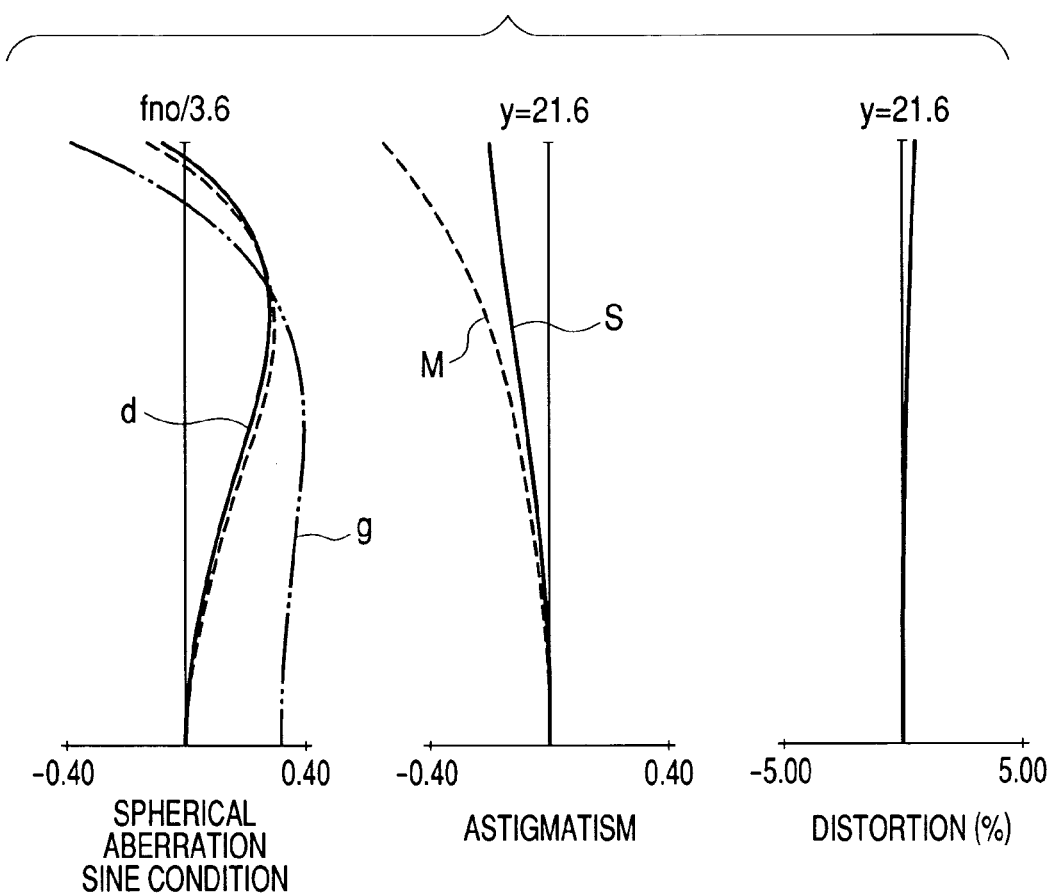
FIG. 27 is a longitudinal aberration diagram of the image pickup lens system of the fourth embodiment at the time of image pickup of an infinite object.
Figure 28:
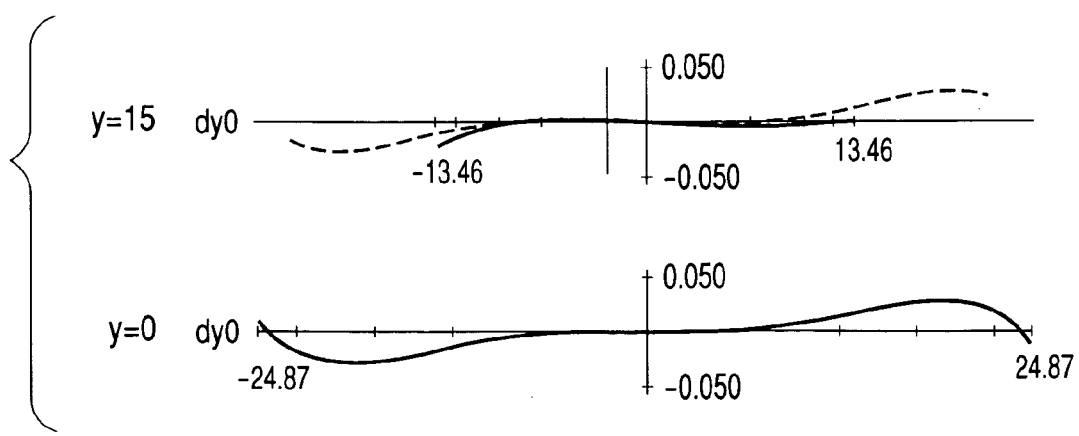
FIG. 28 is a lateral aberration diagram of the image pickup lens system of the fourth embodiment at the time of image pickup of an infinite object.
Figure 29:
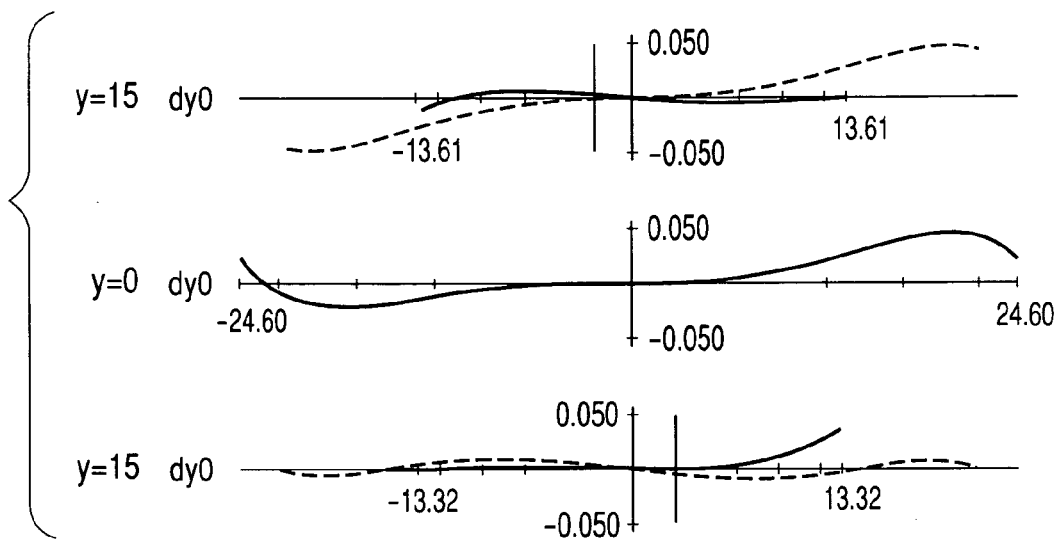
FIG. 29 is a lateral aberration diagram of the image pickup lens system of the fourth embodiment in a vibration proof state (0.3°) at the time of image pickup of an infinite object.
Figure 30:
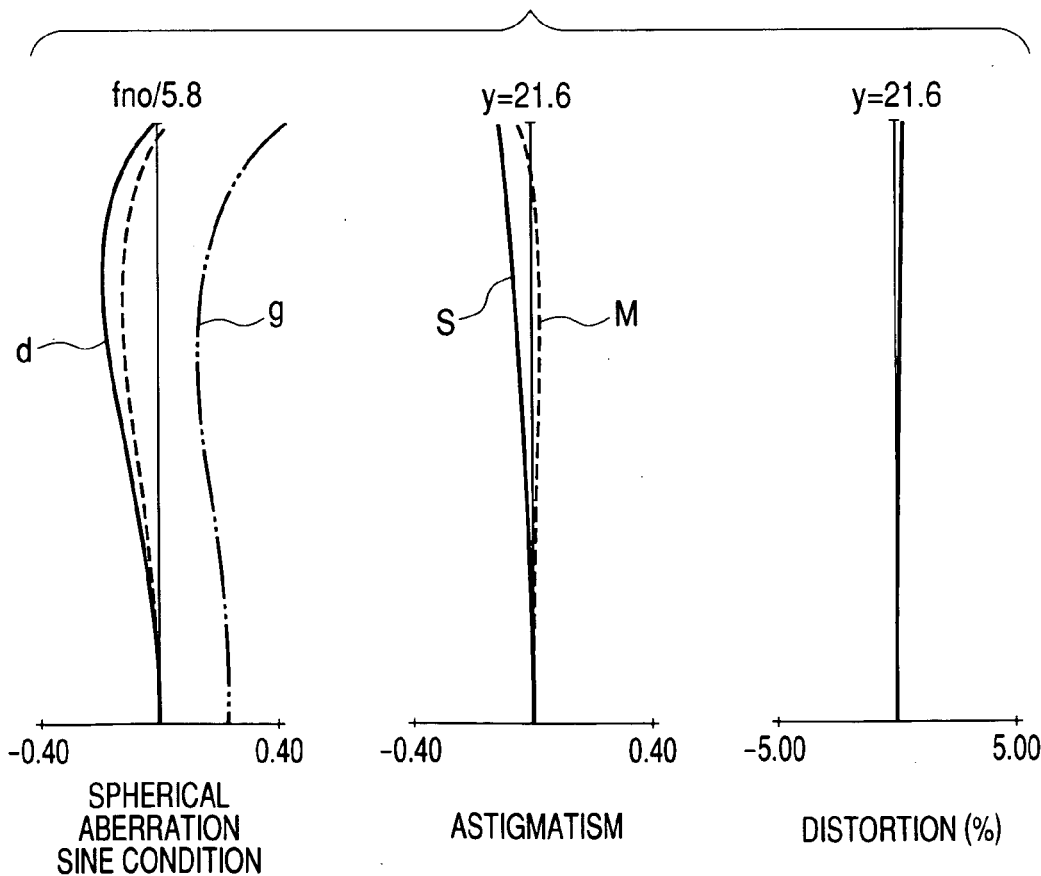
FIG. 30 is a longitudinal aberration diagram of the image pickup lens system of the fourth embodiment at the time of image pickup of a short distance object.
Figure 31:
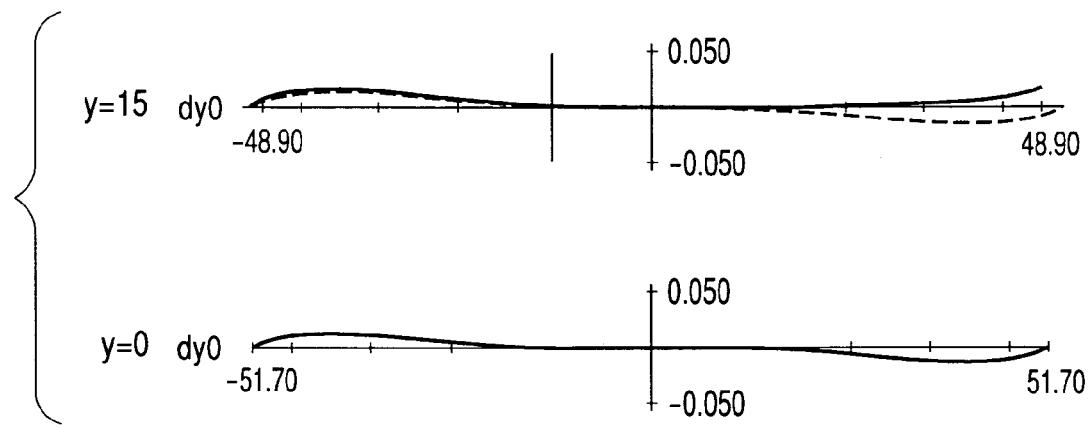
FIG. 31 is a lateral aberration diagram of the image pickup lens system of the fourth embodiment at the time of image pickup of a short distance object.
Figure 32:
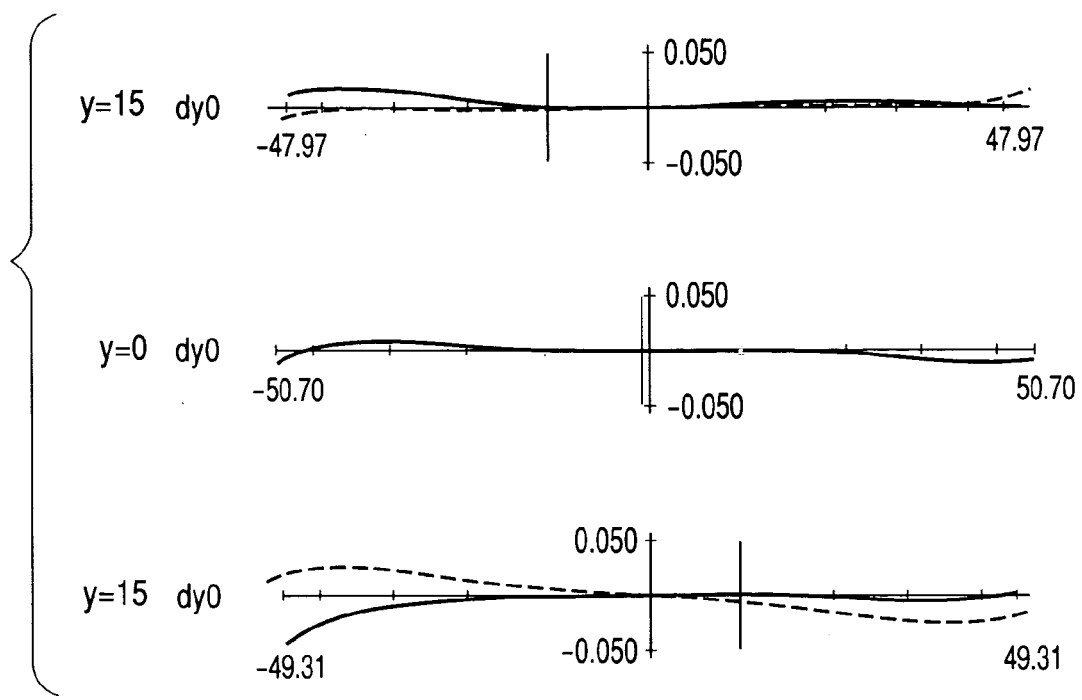
FIG. 32 is a lateral aberration diagram of the image pickup lens system of the fourth embodiment in a vibration proof state (0.3°) at the time of image pickup of a short distance object.

FIG. 25 is a sectional view of an image pickup lens system of a fourth embodiment at the time of image pickup of an infinite object. FIG. 26 is a sectional view of the image pickup lens system of the fourth embodiment at the time of image pickup of a short distance object (magnification β=−1). FIG. 27 is a longitudinal aberration diagram of the image pickup lens system of the fourth embodiment at the time of image pickup of an infinite object. FIG. 28 is a lateral aberration diagram of the image pickup lens system of the fourth embodiment at the time of image pickup of an infinite object. FIG. 29 is a lateral aberration diagram of the image pickup lens system of the fourth embodiment in a vibration reduction state (0.3°) at the time of image pickup of an infinite object. FIG. 30 is a longitudinal aberration diagram of the image pickup lens system of the fourth embodiment at the time of image pickup of a short distance object. FIG. 31 is a lateral aberration diagram of the image pickup lens system of the fourth embodiment at the time of image pickup of a short distance object. FIG. 32 is a lateral aberration diagram of the image pickup lens system of the fourth embodiment in a vibration reduction state (0.3°) at the time of image pickup of a short distance object.

Figure 33:
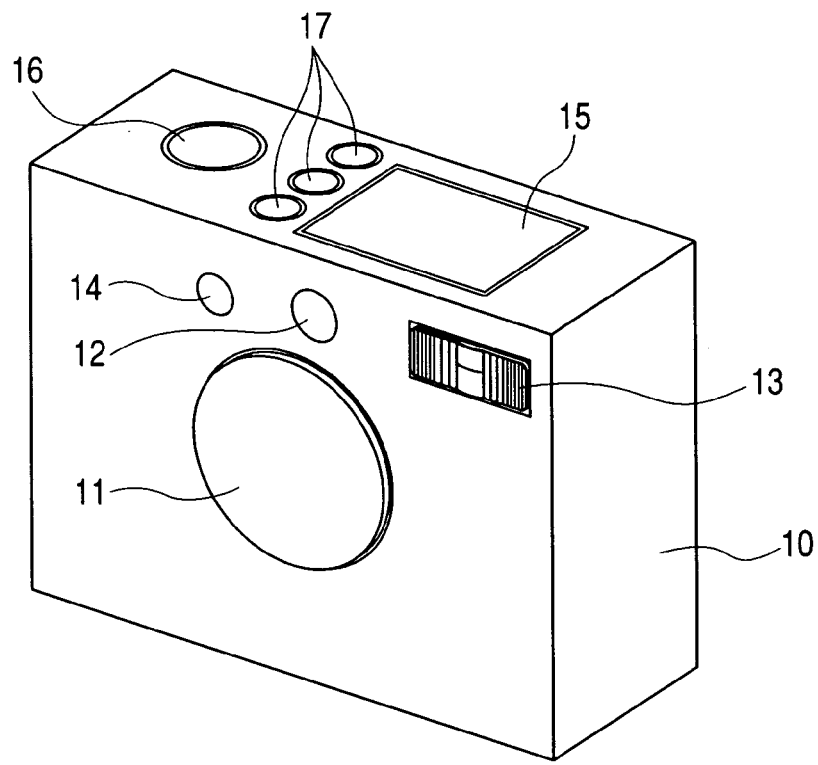
FIG. 33 is a schematic drawing of a principal part of a compact type digital still camera.
Figure 34:
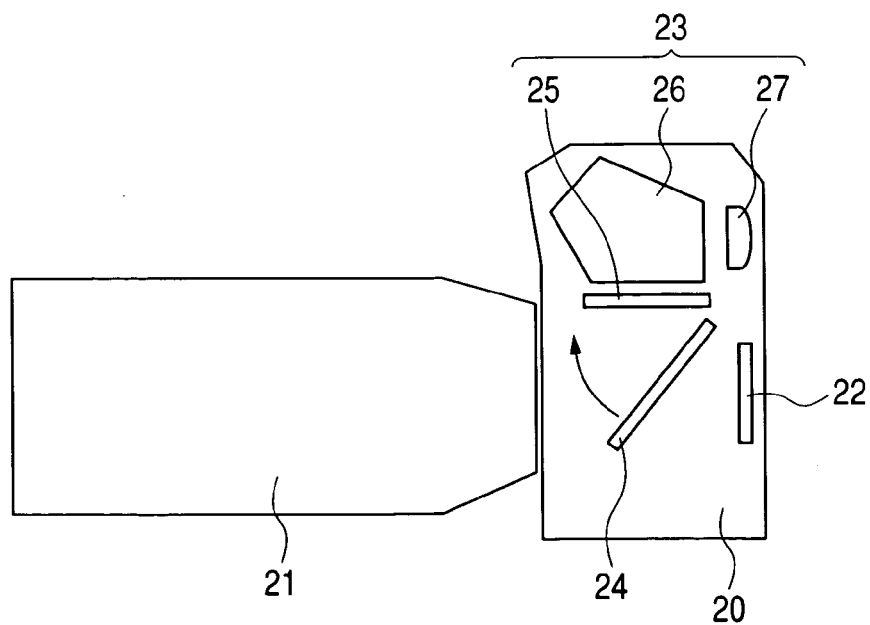
FIG. 34 is a schematic drawing of a principal part of a single-lens reflex camera.

FIG. 33 is a schematic drawing of a principal part of a digital still camera, which has the image pickup lens system of the present invention. In addition, FIG. 34 is a schematic drawing of a principal part of a single-lens reflex camera, which can mount the image pickup lens system of the present invention.

In each sectional view of lens systems in FIGS. 1, 2, 9, 10, 17, 18, 25, and 26, the right is an object side (front) and the left is an image side (back). Reference character LZ denotes an image pickup lens system, and L1 denotes a first lens unit with positive refracting power (optical power=reciprocal of focal length) and has a first lens sub-unit L1A with positive refracting power and a second lens sub-unit L1B with positive refracting power. Reference numeral L2 denotes a second lens unit with negative refracting power, L3 denotes a third lens unit with positive refracting power, and L4 denotes a fourth lens unit with positive refracting power.

Reference character SP denotes an aperture stop. Reference character IP denotes an image plane, where a photosensitive surface of a solid-state image pickup device (photoelectric transducer) such as a CCD sensor or a CMOS sensor, or a silver halide film, is disposed. Reference character FP denotes a flare stop, and is disposed at the object side of the fourth lens unit L4 to reduce an amount of flare incident on an effective area of the photosensitive surface.

Each arrow in the sectional views of a lens unit shows the direction of the movement of each lens unit at the time of focusing on a short distance object (magnification β=−1) from an infinite object (in connection with the increase in the absolute value of magnification).

In spherical aberration diagrams in the longitudinal aberration diagrams shown in FIGS. 3, 6, 11, 14, 19, 22, 27, and 30, a solid line shows a d line, a two-dot chain line shows a g line, and a broken line shows a sine condition. In each astigmatism diagram, reference character S denotes the sagittal image plane and M denotes the meridional image plane.

In each embodiment, the first lens sub-unit L1A is constituted by four lenses, a positive lens with both convex surfaces, a positive lens with both convex surfaces, a negative lens with a concave surface in the object side, and a positive lens with a convex surface in the object side in order from the object side to the image side, and they never move with respect to the image plane for focusing. The second lens sub-unit L1B is constituted by two lenses, a negative meniscus lens with a convex surface in the object side and a positive lens with both convex surfaces. The second lens unit L2 is constituted by a negative lens with a concave surface in the image side, and a doublet constituted by a negative lens with both concave surfaces and a positive lens. The third lens unit L3 is constituted by a positive lens with a convex surface in the image side, and a doublet constituted by a positive lens with both convex surfaces and a negative lens. The fourth lens unit L4 is constituted by two lenses, a negative meniscus lens with a concave surface in the object side and a positive lens with a convex surface in the object side.

In each embodiment, at the time of focusing on from an infinite object to a short distance object (magnification β=−1), the second lens unit L2 moves toward the image side, and the third lens unit L3 moves toward the object side. This makes it possible to take an image in high magnification without enlarging a movement amount of each lens unit.

Although being fixed with respect to the image plane on focusing, the aperture stop SP can be moved in the direction of the optical axis.

In addition, by moving the second lens sub-unit L1B by a proper amount of distance so as to have a component in a direction orthogonal to the optical axis according to the eccentricity of the imaging system, the displacement (the blur of an image) of a taken image is corrected while preventing the image quality from deteriorating when the imaging system is eccentric in a direction except the direction of the optical axis by the shake (vibration) of a camera or the like. It is preferable in viewpoint of suppression of occurrence of an eccentric aberration that the second lens sub-unit L1B has one or more positive lenses and negative lenses, respectively.

In each embodiment, let a movement amount in a directional component orthogonal to the optical axis of the second lens sub-unit L1B "$\Delta H$," let a correction amount of a displacement of a taken image with respect to the movement amount $\Delta H$ of the second lens sub-unit L1B (a displacement amount of the image) "$\Delta x$," let distance from a surface vertex in the image side of a lens which is nearest to the image among the lenses constituting the first lens sub-unit L1A, to a surface vertex in the object side of a lens which is nearest to the object among the lenses constituting the second lens sub-unit L1B "D," let a movement amount of the second lens unit L2 in focusing "$\Delta S2$," let a movement amount of the third lens unit L3 "$\Delta S3$" (which is "positive" when the moving direction is that of the image side, and is "negative" when the moving direction is that of the object side), let the focal length of the first lens sub-unit L1A "f1A," let the focal length of the second lens sub-unit L1B "f1B," let the distance (so-called back focus) from a surface vertex in the image side of a lens which is the nearest to the image side, to the image plane "Bf," and let the focal length of the entire lens system at the time of focusing on a infinite object f, and any one or more of the following conditional expressions are satisfied:

$$0.8 < |\Delta x/\Delta H| < 1.5 \quad (1)$$

$$0.1 < D/f1B < 0.3 \quad (2)$$

$$1.0 < |\Delta S3/\Delta S2| < 2.5 \quad (3)$$

$$0.8 < f1A/f1B < 1.2 \quad (4)$$

$$Bf/f > 0.3 \quad (5)$$

Then, by satisfying each conditional expression, an effect which corresponds to it and is described later is obtained.

Next, the technical meaning of the above-mentioned conditional expressions will be explained.

Conditional expression (1) is a conditional expression relating to eccentricity sensitivity (a correction amount of a displacement of an image with respect to a unit movement amount of the second lens sub-unit L1B which is a movable lens unit). When the eccentricity sensitivity becomes smaller than the lower limit of conditional expression (1), the correction of the eccentric aberration caused by the eccentricity of the movable lens unit becomes easy. However, it is not preferable that the driving amount of the movable lens unit for correcting the displacement of the image becomes large and that mechanical structure becomes large. In addition, when the eccentricity sensitivity becomes larger than the upper limit, the driving amount becomes small. However, it is not preferable that the eccentric aberration, in particular, an eccentric coma becomes large.

Conditional expression (2) relates to a ratio of the distance from a surface vertex in an image side of the lens which is the nearest to the image side of the first lens sub-unit L1A to a surface vertex in an object side of a lens which is the nearest to the object side of the second lens sub-unit L1B (that is, an axial interval between the first lens sub-unit L1A and second lens sub-unit L1B), and the focal length of the second lens sub-unit L1B. When the distance between the first lens sub-unit L1A and second lens sub-unit L1B becomes smaller than the lower limit of conditional expression (2), the height of a pencil of light rays incident on the second lens sub-unit L1B becomes large. Hence, it becomes necessary to enlarge the external diameter of lenses of the second lens sub-unit L1B. Therefore, the response at the time of driving gets worse because of the upsizing of a vibration reduction unit, and the increase in weight of the movable lens unit. When the distance between the first lens sub-unit L1A and second lens sub-unit L1B becomes longer than the upper limit, it is advantageous to the miniaturization of a movable lens unit, however, the pencil of light rays incident on the second lens unit L2 also becomes small, and becomes hard to correct a spherical aberration caused by the first lens sub-unit L1A and the second lens sub-unit L1B, by the second lens unit L2.

Conditional expression (3) relates to a ratio of a movement amount of the second lens unit L2 to a movement amount of the third lens unit L3 in focusing. It becomes possible to reduce the external diameter of the fourth lens unit L4 since the distance between the stop SP and fourth lens unit L4 becomes short when the movement amount of the third lens unit L3 becomes smaller than the lower limit. However, since it becomes necessary to enlarge the movement amount of the second lens unit L2 for focusing, therefore, it becomes necessary to enlarge the distance between the stop SP and second lens sub-unit L1B so as to secure a moving space for the second lens unit L2, and hence, overall lens length increases, which is not preferable. When the movement amount of the third lens unit L3 becomes larger than the upper limit, it becomes necessary to enlarge the fourth lens unit L4 so as to secure a light amount in a peripheral part of the image plane, and hence, a mechanical structure is enlarged.

Conditional expression (4) relates to a ratio of the focal length of the first lens sub-unit L1A to the focal length of the second lens sub-unit L1B. When the focal length of the first lens sub-unit L1A becomes smaller than the lower limit of conditional expression (4), it is possible to fully converge the pencil of light rays incident on the second lens sub-unit L1B. Hence, it is possible to reduce the external diameter of lenses of the second lens sub-unit L1B. Nevertheless, it becomes hard for the second lens unit L2 to correct a minus spherical aberration generated in the first lens sub-unit L1A. When the focal length of the first lens sub-unit L1A becomes larger than the upper limit, it is not possible to fully converge the pencil of light rays incident on the second lens sub-unit L1B. Hence, the external diameter of the second lens sub-unit L1B becomes large, which causes the upsizing of the vibration proof unit.

Conditional expression (5) expresses a ratio of the distance from a surface vertex in the image side of the lens which is the nearest to the image, to an image pickup face, to the focal length of the entire lens system at the time of focusing on an infinite object. If the ratio becomes lower than the lower limit, it becomes hard to attach an attachment and the like between a lens body and a camera body.

In addition, in each embodiment, still more preferably, it is better to set numerical values of conditional expressions (1) to (5) as follows:

$$0.9<|\Delta x/\Delta H|<1.4 \quad (1a)$$

$$0.15<D/f1B<0.25 \quad (2a)$$

$$1.3<|\Delta S3/\Delta S2|<2.3 \quad (3a)$$

$$0.9<f1A/f1B<1.1 \quad (4a)$$

$$Bf/f>0.35 \quad (5a)$$

As described above, in each embodiment, an image pickup lens system which has an angle of view of about 24° and an aperture ratio equivalent to f-number of about 3.5 is attained, wherein the image pickup lens system which not only has the high optical performance obtained by favorably performing an aberration correction at the time of focusing on objects in a wide range from infinite objects to short distance objects with life size by specifying each construction, but also can correct a blur of a taken image which is caused by the shake of a camera and the like.

Next, an embodiment of a compact type (lens-integrated type) digital still camera, which has the image pickup lens system of the present invention, will be explained by using FIG. 33.

In FIG. 33, reference numeral 10 denotes a camera body, 11 denotes the image pickup lens system of the present invention, and 12 denotes a view finder for observing an object image. Reference numeral 13 denotes a strobe lighting system, 14 denotes a photometric and ranging window, 15 denotes a liquid crystal display window showing the operation of the camera, 16 denotes a release button, and 17 denotes control switches which switch various kinds of modes.

FIG. 34 is a schematic drawing of a principal part of a single-lens reflex camera such as a film camera or a digital still camera, of which the image pickup lens system of the present invention is applied to an interchangeable lens.

In FIG. 34, reference numeral 20 denotes a camera body, 21 denotes the image pickup lens system of the present invention, and 22 denotes a photosensitive surface, which is constituted by a silver halide film, a solid state image pickup device (photoelectric transducer), or the like. Reference numeral 23 denotes a finder system, which has a focal plane plate 25 on which an object image is formed, a penta prism 26 as an image reversal means, and an eyepiece 27 for observing the object image on the focal plane plate 25. Reference numeral 24 denotes a quick return mirror.

In this way, by applying the image pickup lens system of the present invention to an imaging apparatus such as a compact type digital still camera or a single-lens reflex camera, it becomes possible to realize an imaging apparatus which not only can focus on a short distance object up to nearly life-size, but also can obtain a satisfactorily taken image.

Hereinafter, numeric data of the numerical embodiments 1 to 4 corresponding to the first to fourth embodiments will be shown. In each numerical embodiment, i denotes a sequence of a surface from the object side, ri denotes the radius of curvature of each surface, and di denotes a member thickness or air space between the i-th surface and the (i+1)-th surface, and ni and vi denote a refractive index and an Abbe number on the basis of a d line, respectively. "f" denotes focal length, Fno denotes f-number, and ω denotes a half-angle of view.

Moreover, the correspondence with the above-mentioned conditional expressions in each numerical embodiment is shown in Table 1.

| Numerical embodiment 1 f = 180.0 FNo = 1:3.6 2ω = 13.6° ||||||
|---|---|---|---|---|---|
| r1 = | 260.038 | d1 = | 6.00 | n1 = 1.51633 | v1 = 64.1 |
| r2 = | −112.322 | d2 = | 0.20 | | |
| r3 = | 94.925 | d3 = | 5.61 | n2 = 1.49700 | v2 = 81.5 |
| r4 = | −452.442 | d4 = | 2.15 | | |
| r5 = | −134.846 | d5 = | 2.70 | n3 = 1.83400 | v3 = 37.2 |
| r6 = | 759.650 | d6 = | 0.20 | | |
| r7 = | 96.400 | d7 = | 4.50 | n4 = 1.49700 | v4 = 81.5 |
| r8 = | 293.895 | d8 = | 21.78 | | |
| r9 = | 57.808 | d9 = | 2.50 | n5 = 1.84666 | v5 = 23.8 |
| r10 = | 40.674 | d10 = | 0.81 | | |
| r11 = | 48.558 | d11 = | 5.59 | n6 = 1.60311 | v6 = 60.6 |
| r12 = | −202.644 | d12 = | 2.00 | | |
| r13 = | ∞ | d13 = | variable | | |
| r14 = | −543.534 | d14 = | 1.80 | n7 = 1.83481 | v7 = 42.7 |
| r15 = | 37.688 | d15 = | 3.70 | | |
| r16 = | −71.688 | d16 = | 1.60 | n8 = 1.66672 | v8 = 48.3 |
| r17 = | 34.428 | d17 = | 4.15 | n9 = 1.84666 | v9 = 23.8 |
| r18 = | 1,298.215 | d18 = | variable | | |
| r19 = | ∞ | d19 = | variable | | |
| r20 = | 93.163 | d20 = | 2.80 | n10 = 1.77250 | v10 = 49.6 |
| r21 = | −3,659.440 | d21 = | 0.15 | | |
| r22 = | 75.307 | d22 = | 5.50 | n11 = 1.71300 | v11 = 53.9 |
| r23 = | −56.399 | d23 = | 2.00 | n12 = 1.60342 | v12 = 38.0 |
| r24 = | 43.279 | d24 = | variable | | |
| r25 = | ∞ | d25 = | 11.36 | | |
| r26 = | −35.806 | d26 = | 3.00 | n13 = 1.84666 | v13 = 23.8 |
| r27 = | −41.979 | d27 = | 0.15 | | |
| r28 = | 89.440 | d28 = | 4.00 | n14 = 1.71300 | v14 = 53.9 |
| r29 = | 1,749.209 | | | | |

| Variable | Magnification |||
|---|---|---|---|
| interval | 0.0x | 0.5x | 1.0x |
| d13 | 0.28 | 10.90 | 19.08 |
| d18 | 20.34 | 9.72 | 1.54 |
| d19 | 34.28 | 23.81 | 5.23 |
| d24 | 17.14 | 27.62 | 46.19 |

| Numerical embodiment 2 f = 180.0 FNo = 1:3.6 2ω = 13.7° ||||||
|---|---|---|---|---|---|
| r1 = | 284.394 | d1 = | 6.00 | n1 = 1.51633 | v1 = 64.1 |
| r2 = | −107.841 | d2 = | 0.20 | | |
| r3 = | 96.736 | d3 = | 5.39 | n2 = 1.49700 | v2 = 81.5 |
| r4 = | −423.127 | d4 = | 2.15 | | |
| r5 = | −126.816 | d5 = | 2.70 | n3 = 1.83400 | v3 = 37.2 |
| r6 = | 1,613.151 | d6 = | 0.20 | | |
| r7 = | 102.461 | d7 = | 4.50 | n4 = 1.49700 | v4 = 81.5 |
| r8 = | 352.644 | d8 = | 21.70 | | |
| r9 = | 56.856 | d9 = | 2.50 | n5 = 1.84666 | v5 = 23.8 |
| r10 = | 39.356 | d10 = | 0.73 | | |
| r11 = | 45.771 | d11 = | 5.77 | n6 = 1.60311 | v6 = 60.6 |
| r12 = | −200.072 | d12 = | 2.00 | | |
| r13 = | ∞ | d13 = | variable | | |
| r14 = | −450.819 | d14 = | 1.80 | n7 = 1.83481 | v7 = 42.7 |
| r15 = | 37.489 | d15 = | 3.64 | | |
| r16 = | −73.773 | d16 = | 1.60 | n8 = 1.66672 | v8 = 48.3 |
| r17 = | 33.348 | d17 = | 4.16 | n9 = 1.84666 | v9 = 23.8 |
| r18 = | 727.193 | d18 = | variable | | |
| r19 = | ∞ | d19 = | variable | | |
| r20 = | 4,240.107 | d20 = | 2.80 | n10 = 1.77250 | v10 = 49.6 |
| r21 = | −126.763 | d21 = | 0.15 | | |
| r22 = | 115.669 | d22 = | 5.50 | n11 = 1.71300 | v11 = 53.9 |
| r23 = | −39.405 | d23 = | 2.00 | n12 = 1.60342 | v12 = 38.0 |
| r24 = | 85.247 | d24 = | variable | | |
| r25 = | ∞ | d25 = | 11.36 | | |
| r26 = | −30.300 | d26 = | 3.00 | n13 = 1.84666 | v13 = 23.8 |
| r27 = | −34.363 | d27 = | 0.15 | | |
| r28 = | 68.923 | d28 = | 4.00 | n14 = 1.71300 | v14 = 53.9 |
| r29 = | 129.681 | | | | |

-continued

| Variable | Magnification | | |
|---|---|---|---|
| interval | 0.0x | 0.5x | 1.0x |
| d13 | 0.32 | 9.60 | 17.05 |
| d18 | 18.31 | 9.03 | 1.57 |
| d19 | 41.20 | 24.49 | 7.21 |
| d24 | 12.19 | 28.90 | 46.19 |

Numerical embodiment 3
f = 180.0 FNo = 1:3.6 2ω = 13.7°

| r1 = | 303.378 | d1 = | 6.00 | n1 = | 1.51633 | ν1 = | 64.1 |
|---|---|---|---|---|---|---|---|
| r2 = | −100.037 | d2 = | 0.20 | | | | |
| r3 = | 92.365 | d3 = | 5.12 | n2 = | 1.49700 | ν2 = | 81.5 |
| r4 = | −662.541 | d4 = | 2.15 | | | | |
| r5 = | −120.011 | d5 = | 2.70 | n3 = | 1.83400 | ν3 = | 37.2 |
| r6 = | 634.975 | d6 = | 0.20 | | | | |
| r7 = | 93.884 | d7 = | 4.50 | n4 = | 1.49700 | ν4 = | 81.5 |
| r8 = | 985.781 | d8 = | 21.72 | | | | |
| r9 = | 57.309 | d9 = | 2.50 | n5 = | 1.84666 | ν5 = | 23.8 |
| r10 = | 38.196 | d10 = | 0.54 | | | | |
| r11 = | 42.540 | d11 = | 5.65 | n6 = | 1.60311 | ν6 = | 60.6 |
| r12 = | −225.872 | d12 = | 2.00 | | | | |
| r13 = | ∞ | d13 = | variable | | | | |
| r14 = | −729.521 | d14 = | 1.80 | n7 = | 1.83481 | ν7 = | 42.7 |
| r15 = | 33.568 | D15 = | 4.02 | | | | |
| r16 = | −67.338 | d16 = | 1.60 | n8 = | 1.66672 | ν8 = | 48.3 |
| r17 = | 32.442 | d17 = | 4.52 | n9 = | 1.84666 | ν9 = | 23.8 |
| r18 = | −712.770 | d18 = | variable | | | | |
| r19 = | ∞ | d19 = | variable | | | | |
| r20 = | −75.809 | d20 = | 2.80 | n10 = | 1.77250 | ν10 = | 49.6 |
| r21 = | −64.772 | d21 = | 0.15 | | | | |
| r22 = | 293.088 | d22 = | 6.00 | n11 = | 1.71300 | ν11 = | 53.9 |
| r23 = | −35.012 | d23 = | 2.00 | n12 = | 1.60342 | ν12 = | 38.0 |
| r24 = | −212.822 | d24 = | variable | | | | |
| r25 = | ∞ | d25 = | 11.36 | | | | |
| r26 = | −50.101 | d26 = | 3.00 | n13 = | 1.84666 | ν13 = | 23.8 |
| r27 = | −73.782 | d27 = | 0.15 | | | | |
| r28 = | 92.464 | d28 = | 4.00 | n14 = | 1.71300 | ν14 = | 53.9 |
| r29 = | 266.314 | | | | | | |

| Variable | Magnification | | |
|---|---|---|---|
| interval | 0.0x | 0.5x | 1.0x |
| d13 | 0.23 | 8.68 | 17.13 |
| d18 | 18.39 | 9.95 | 1.50 |
| d19 | 33.99 | 16.69 | 7.99 |
| d24 | 11.91 | 29.21 | 37.91 |

Numerical embodiment 4
f = 180.0 FNo = 1:3.6 2ω = 13.7°

| r1 = | 279.106 | D1 = | 6.00 | n1 = | 1.51633 | ν1 = | 64.1 |
|---|---|---|---|---|---|---|---|
| r2 = | −99.049 | D2 = | 0.20 | | | | |
| r3 = | 93.658 | D3 = | 4.96 | n2 = | 1.49700 | ν2 = | 81.5 |
| r4 = | −979.683 | D4 = | 2.15 | | | | |
| r5 = | −119.311 | D5 = | 2.70 | n3 = | 1.83400 | ν3 = | 37.2 |
| r6 = | 523.655 | D6 = | 0.20 | | | | |
| r7 = | 93.917 | D7 = | 4.50 | n4 = | 1.49700 | ν4 = | 81.5 |
| r8 = | 3,660.587 | D8 = | 22.10 | | | | |
| r9 = | 57.650 | D9 = | 2.50 | n5 = | 1.84666 | ν5 = | 23.8 |
| r10 = | 38.307 | D10 = | 0.51 | | | | |
| r11 = | 42.158 | D11 = | 5.76 | n6 = | 1.60311 | ν6 = | 60.6 |
| r12 = | −236.071 | D12 = | 2.00 | | | | |
| r13 = | ∞ | D13 = | variable | | | | |
| r14 = | −421.078 | D14 = | 1.80 | n7 = | 1.83481 | ν7 = | 42.7 |
| r15 = | 33.076 | D15 = | 4.03 | | | | |
| r16 = | −69.510 | D16 = | 1.60 | n8 = | 1.66672 | ν8 = | 48.3 |
| r17 = | 31.362 | D17 = | 4.65 | n9 = | 1.84666 | ν9 = | 23.8 |
| r18 = | −866.687 | d18 = | variable | | | | |
| r19 = | ∞ | D19 = | variable | | | | |
| r20 = | −104.897 | D20 = | 2.80 | n10 = | 1.77250 | ν10 = | 49.6 |
| r21 = | −77.003 | D21 = | 0.15 | | | | |
| r22 = | 189.551 | D22 = | 6.00 | n11 = | 1.71300 | ν11 = | 53.9 |
| r23 = | −36.758 | D23 = | 2.00 | n12 = | 1.60342 | ν12 = | 38.0 |
| r24 = | −304.941 | D24 = | variable | | | | |
| r25 = | ∞ | D25 = | 11.36 | | | | |
| r26 = | −52.559 | D26 = | 3.00 | n13 = | 1.84666 | ν13 = | 23.8 |
| r27 = | −83.498 | D27 = | 0.15 | | | | |
| r28 = | 102.587 | D28 = | 4.00 | n14 = | 1.71300 | ν14 = | 53.9 |
| r29 = | 292.027 | | | | | | |

| Variable | Magnification | | |
|---|---|---|---|
| interval | 0.0x | 0.5x | 1.0x |
| d13 | 0.33 | 8.76 | 17.17 |
| d18 | 18.34 | 9.91 | 1.50 |
| d19 | 35.25 | 19.76 | 12.25 |
| d24 | 14.81 | 30.30 | 37.81 |

TABLE 1

| | Numerical embodiments | | | |
|---|---|---|---|---|
| Conditional expressions | Embodiment 1 | Embodiment 2 | Embodiment 3 | Embodiment 4 |
| (1) Δx/ΔH | 1.05 | 1.21 | 1.14 | 1.14 |
| (2) D/f1B | 0.20 | 0.21 | 0.21 | 0.21 |
| (3) ΔS3/ΔS2 | 1.55 | 2.01 | 1.54 | 1.37 |
| (4) f1A/f1B | 1.01 | 1.03 | 0.99 | 1.00 |
| (5) Bf/f | 0.38 | 0.38 | 0.38 | 0.38 |

This application claims priority from Japanese Patent Application No. 2003-206818 filed on Aug. 8, 2003, which is hereby incorporated by reference herein.

What is claimed is:

1. An image pickup optical system, in order from an object side to an image side, comprising:
a first lens unit with positive optical power, the first lens unit having a first lens sub-unit and a second lens sub-unit in order from an object to an image side;
a second lens unit with negative optical power;
a third lens unit with positive optical power; and
a fourth lens unit,
wherein the second lens unit moves toward an image side and the third lens unit moves toward an object side respectively during focusing from an infinite object to a short distance object;
wherein the second lens sub-unit displaces an image formed by the image pickup optical system in a direction orthogonal to an optical axis, by moving so as to have a component in a direction orthogonal to the optical axis; and
wherein the following condition is satisfied:

$$0.8 < |\Delta x / \Delta H| < 1.5$$

where "ΔH" represents a movement amount of the second lens sub-unit in a direction orthogonal to the optical axis, and "Δx" represents a displacement amount of an image formed by the image pickup optical system in the direction orthogonal to the optical axis with respect to the movement amount ΔH of the second lens sub-unit.

2. The image pickup optical system according to claim 1, wherein the following condition is satisfied:

$$0.1 < D/f1B < 0.3$$

where "D" represents distance from a surface vertex in an image side of a lens which is the nearest to an image among lenses constituting the first lens sub-unit, to a surface vertex in an object side of a lens which is the nearest to an object among lenses constituting the second lens sub-unit and "f1B" represents focal length of the second lens sub-unit.

3. The image pickup optical system according to claim 1, wherein the following condition is satisfied:

$$1.0 < |\Delta S3/\Delta S2| < 2.5$$

where "ΔS2" represents a movement amount of the second lens unit in focusing, and "ΔS3" represents a movement amount of the third lens unit in focusing.

4. The image pickup optical system according to claim 1, wherein the following condition is satisfied:

$$0.8 < f1A/f1B < 1.2$$

where "f1A" represents a focal length of the first lens sub-unit, and "f1B" represents a focal length of the second lens sub-unit.

5. The image pickup optical system according to claim 1, wherein the following condition is satisfied:

$$Bf/f > 0.3$$

where "Bf" represents a distance from a surface vertex in an image side of a lens which is the nearest to an image among lenses in the image pickup optical system, to an image plane, and "f" represents a focal length of an entire lens system at the time of focusing in an infinite object.

6. The image pickup optical system according to claim 1, wherein the image pickup optical system forms an image on a solid-state image pickup device.

7. A camera, comprising:
the image pickup optical system according to claim 1; and
a photoelectric transducer which receives an image formed by the image pickup optical system.

8. An image pickup optical system, in order from an object side to an image side, comprising:
a first lens unit with positive optical power, the first lens unit having a first lens sub-unit and a second lens sub-unit in order from an object to an image side;
a second lens unit with negative optical power;
a third lens unit with positive optical power; and
a fourth lens unit,
wherein the second lens unit moves toward an image side and the third lens unit moves toward an object side respectively during focusing from an infinite object to a short distance object;
wherein the second lens sub-unit displaces an image formed by the image pickup optical system in a direction orthogonal to an optical axis, by moving so as to have a component in a direction orthogonal to the optical axis; and
wherein the following condition is satisfied:

$$0.1 < D/f1B < 0.3$$

where "D" represents distance from a surface vertex in an image side of a lens which is the nearest to an image among lenses constituting the first lens sub-unit, to a surface vertex in an object side of a lens which is the nearest to an object among lenses constituting the second lens sub-unit and "f1B" represents focal length of the second lens sub-unit.

9. An image pickup optical system, in order from an object side to an image side, comprising:
a first lens unit with positive optical power, the first lens unit having a first lens sub-unit and a second lens sub-unit in order from an object to an image side;
a second lens unit with negative optical power;
a third lens unit with positive optical power; and
a fourth lens unit,
wherein the second lens unit moves toward an image side and the third lens unit moves toward an object side respectively during focusing from an infinite object to a short distance object;
wherein the second lens sub-unit displaces an image formed by the image pickup optical system in a direction orthogonal to an optical axis, by moving so as to have a component in a direction orthogonal to the optical axis; and
wherein the following condition is satisfied:

$$1.0 < |\Delta S3/\Delta S2| < 2.5$$

where "ΔS2" represents a movement amount of the second lens unit in focusing, and "ΔS3" represents a movement amount of the third lens unit in focusing.

* * * * *